(12) United States Patent
Nanut

(10) Patent No.: US 10,110,140 B1
(45) Date of Patent: Oct. 23, 2018

(54) TRUE DC CURRENT SOURCE

(71) Applicant: James Nanut, Toorak (AU)

(72) Inventor: James Nanut, Toorak (AU)

(*) Notice: Subject to any disclaimer, the term of this patent is extended or adjusted under 35 U.S.C. 154(b) by 0 days.

(21) Appl. No.: 15/595,896

(22) Filed: May 15, 2017

Related U.S. Application Data

(60) Provisional application No. 62/337,298, filed on May 16, 2016.

(51) Int. Cl.
| | |
|---|---|
| *H02M 5/44* | (2006.01) |
| *H02M 1/12* | (2006.01) |
| *H02M 1/14* | (2006.01) |
| *H02M 1/42* | (2007.01) |

(52) U.S. Cl.
CPC .............. *H02M 5/44* (2013.01); *H02M 1/12* (2013.01); *H02M 1/14* (2013.01); *H02M 1/4241* (2013.01)

(58) Field of Classification Search
None
See application file for complete search history.

(56) References Cited

U.S. PATENT DOCUMENTS

| | | | | |
|---|---|---|---|---|
| 2008/0290845 A1* | 11/2008 | Holveck | .............. | H02M 5/271 323/214 |
| 2013/0083571 A1* | 4/2013 | Pu | .......................... | H02M 1/126 363/44 |
| 2013/0285491 A1* | 10/2013 | Kuznetsov | .............. | H02P 25/22 310/71 |
| 2016/0329714 A1* | 11/2016 | Li | .......................... | H02M 7/44 |

\* cited by examiner

*Primary Examiner* — Adolf Berhane
*Assistant Examiner* — Henry Lee, III
(74) *Attorney, Agent, or Firm* — Womble Bond Dickinson (US) LLP

(57) ABSTRACT

According to one embodiment, a power converter circuit includes a resonant circuit coupled to an alternating current (AC) voltage source to convert a first AC voltage to a first AC current and an AC to direct current (AC/DC) converter coupled to the resonant circuit, where the AC/DC converter is to convert the AC current to a DC current. The power converter circuit further includes an inverter coupled to the AC/DC converter to convert the DC current to a second AC current, an AC filtering circuit coupled to an output of the inverter, and a load coupled to the output of the inverter to convert the second AC current to a second AC voltage.

22 Claims, 20 Drawing Sheets

TRUE DC CURRENT SOURCE

RELATED APPLICATIONS

This application claims the priority of U.S. Provisional Patent Application No. 62/337,298, filed May 16, 2016, which is incorporated by reference herein in its entirety.

FIELD OF THE INVENTION

The present invention relates generally to power electronic circuits. More particularly, this invention relates to the generation of a true direct current (DC) source for power electronic circuits. A true current source is characterized by an applying infinite voltage in the case of an open circuit, just as in the same way a true voltage source is characterized by supplying an infinite current during a short circuit.

BACKGROUND

Power conversion, from alternating current (AC) to direct current (DC) and/or from DC to AC is achieved today predominantly by voltage source converters (inverters and rectifiers) having a switching circuit. For example, for a rectifier, either a three phase or single phase AC voltage source supply is rectified to a controlled or uncontrolled DC bus voltage. Inverters in either three phase or single phase power circuits use a fixed DC bus voltage that may be center-tapped to create a modulated stepped waveform on the AC side using a switching algorithm. The stepped waveform is filtered via an AC filter to create an AC voltage. The AC voltage is usually regulated by altering the switching pattern, or by regulating the DC bus voltage, or a combination thereof. The resulting waveform can be connected to a dead load (resistor, inductor, and capacitor) or paralleled with another voltage source, depending on the application.

Typical applications include rectifiers and high current rectifiers (for DC loads), frequency converters, UPSs, solar inverters, battery energy storage systems, etc. The power conversion described above is achieved using voltage source technology. The same power conversion objectives can be achieved using current source technology. This paper seeks to explain a method for the generation of a true current source and how it can be applied in the domain of AC/DC and DC/AC power conversion.

FIG. 1A is a schematic diagram illustrating a series connected inductor and capacitor, or an LC circuit to transform an AC voltage source to an AC current source at the load terminals, load 207. Referring to FIG. 1A, circuit 200 transforms an AC voltage source into an AC current source at load 207. AC voltage source 201, such as an AC 60 Hz 120V, power source provides a constant voltage to circuit 200. Tuning inductor 203 and capacitor 205, having a resonant frequency of $1/(2*pi*SQRT(LC))$, to the voltage source frequency, e.g., 60 Hz, as the load resistance tends toward infinity the load voltage also tends toward infinity. An infinite electro motive force (EMF) or voltage and infinite resistance defines a current source. Here, L is inductance of inductor 203 and C is capacitance of capacitor 205.

FIG. 1B is a schematic diagram illustrating a series connected inductor with a parallel connected capacitor and inductor, or a resonant LCL circuit to transform an AC voltage source to an AC current source at the load terminals. Referring to FIG. 1B, circuit 250 transforms an AC voltage source into an AC current source at load 259. AC voltage source 251, such as an AC 60 Hz 120V, power source provides a constant voltage to circuit 250. Tuning inductor 253 and capacitor 255, having a resonant frequency of inverse of $2\pi$ multiplied by the square root of (LC), to the voltage source frequency, e.g., 60 Hz, drives the circuit to behave with a constant current characteristic. Here, L is inductance of inductor 253 and C is capacitance of capacitor 255. Inductor 257, also tuned to the supply frequency, connected in series with load 259 ensures no current is drawn from the supply at no load due to parallel resonance. Parallel resonance occurs when a circuit current is in phase with the applied voltage of an AC circuit containing an inductor and a capacitor connected in parallel. The circuit creates a true AC current source at load 259, e.g., a current in resistance 259 that is independent of the magnitude of the resistance of load 259.

Appendix A shows calculations for a general case of a 1200 W AC current source of FIG. 1B. The equations prove that if the reactors and capacitors are designed for equal power and tuned to the supply resonant frequency the output current does not vary with a change of load, from zero to nominal ohms for component 259.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1A:
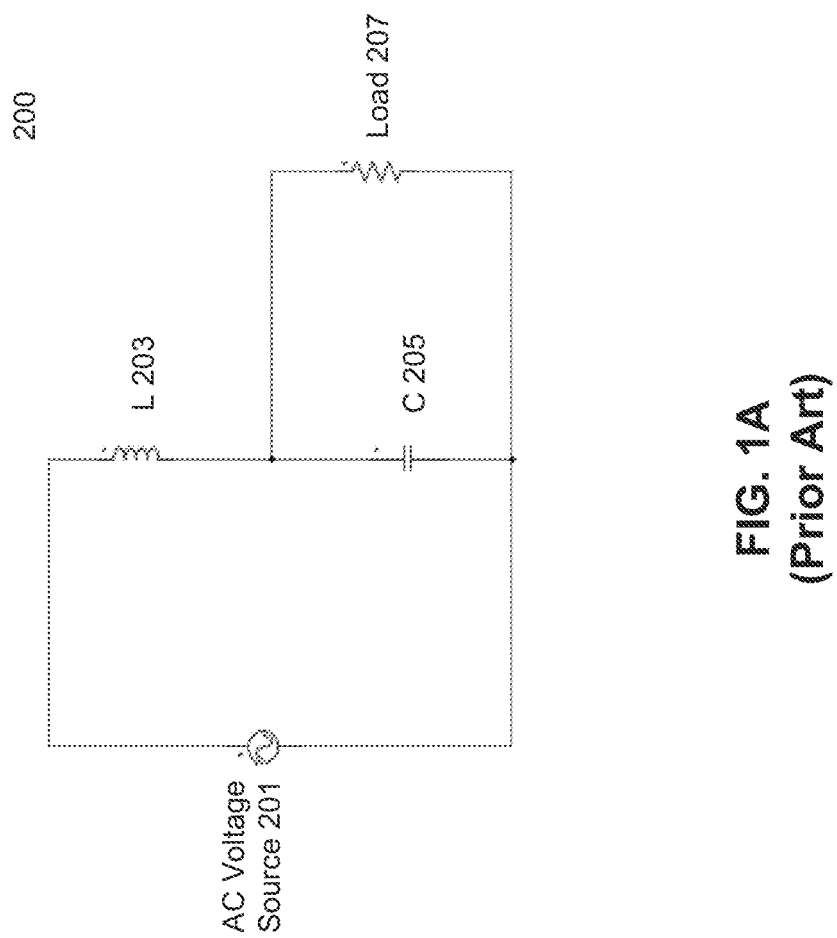
FIGS. 1A and 1B are schematic diagrams illustrating an AC voltage source to AC current source converter.
Figure 1B:
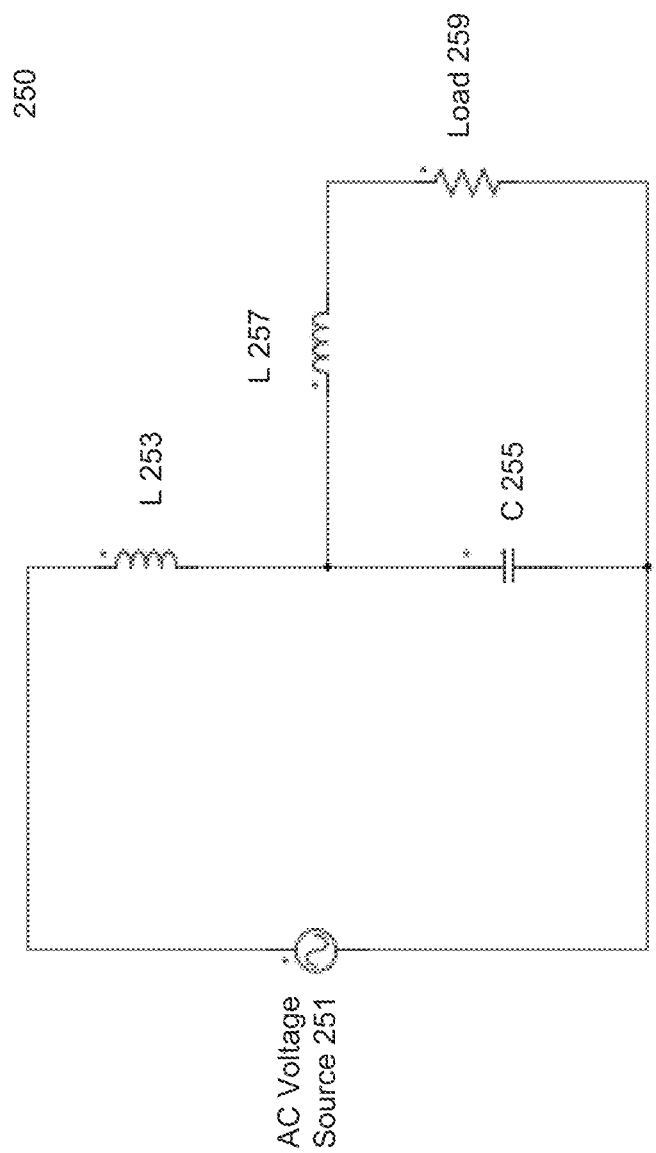

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

The present disclosure describes methods to achieve power conversion, which is able to be applied in the same industries and application as described above, using true current source technology. The primary aim is to create a DC current source from an AC voltage network, from which all the above types of power conversion can be realized.

Voltage source inverter is a DC-AC converter circuit that connects a constant DC voltage source to an inverter circuit to generate an AC voltage with adjustable magnitude and/or frequency. Current source inverter is a DC-AC converter circuit that connects a constant DC current source to an inverter circuit to generate an AC current with adjustable magnitude and/or frequency. A true voltage source is typified supplying an infinite current during a short circuit. A true current source is typified by supplying an infinite voltage during an open circuit.

According to one aspect of the invention, a DC current source circuit includes a resonant circuit coupled to an AC voltage source, an inverter, and an optional load. The AC voltage source may be a single phase or a multi-phase (e.g., three-phase) AC voltage source. The resonant circuit includes an LC circuit with LC parameters configured to resonate based on an operating frequency of the AC voltage source to convert an AC voltage into an AC current, effectively converting the AC voltage source into an AC current source. The LC circuit may be an inductor-capacitor-inductor (LCL) or capacitor-inductor-capacitor (CLC) circuit, connected either in a wye configuration or a delta configuration. The resonant circuit may be a single-phase or multi-phase (e.g., three-phase) resonant circuit. The inverter is configured to convert the AC current into a DC current, effectively converting an AC current source into a DC current source. The DC current with the load converts the DC current into a DC voltage at the load terminals. The inverter may include a rectifier having a diode bridge. The inverter may be a single-phase or multi-phase (e.g., three-phase) inverter.

According to one embodiment, a power converter circuit includes a resonant circuit coupled to an AC voltage source to convert a first AC voltage to a first AC current and an AC to direct current (AC/DC) converter coupled to the resonant circuit, where the AC/DC converter is to convert the AC current to a DC current. The power converter circuit further includes an inverter coupled to the AC/DC converter to convert the DC current to a second AC current, an AC filtering circuit coupled to an output of the inverter, and a load coupled to the output of the inverter to convert the second AC current to a second AC voltage.

According to another aspect of the invention, a power converter circuit includes a DC current source (e.g., true DC current source) and a DC/AC converter or inverter. The DC/AC converter or inverter is utilized as the load that is coupled to the DC current source (e.g., a true DC current source). The DC/AC converter includes a thyristor bridge or inverter and a bank of capacitors coupled to the thyristor bridge. The bank of capacitors serve to provide reactive power to the AC network (e.g., load plus inverter) and to assist in commutation of the thyristors. The thyristor bridge is to convert a DC current generated from the DC current source to an AC current. The thyristor bridge may be a three-phase bridge to convert the DC current into a three-phase AC current.

According to one embodiment, a DC current source circuit includes a resonant circuit coupled to a three-phase AC voltage source to convert an AC voltage to an AC current. The three-phase resonant circuit includes a first inductor-capacitor-inductor (LCL) circuit coupled to a first terminal of the AC voltage source corresponding to a first phase, a second LCL circuit coupled to a second terminal of the AC voltage source corresponding to a second phase, and a third LCL circuit coupled to a third terminal of the AC voltage source corresponding to a third phase. The DC current source circuit further includes a rectifier coupled to the resonant circuit to convert the AC current to a DC current. The rectifier includes a diode bridge having six diodes and an output of the rectifier is coupled to a load.

Figure 2A:
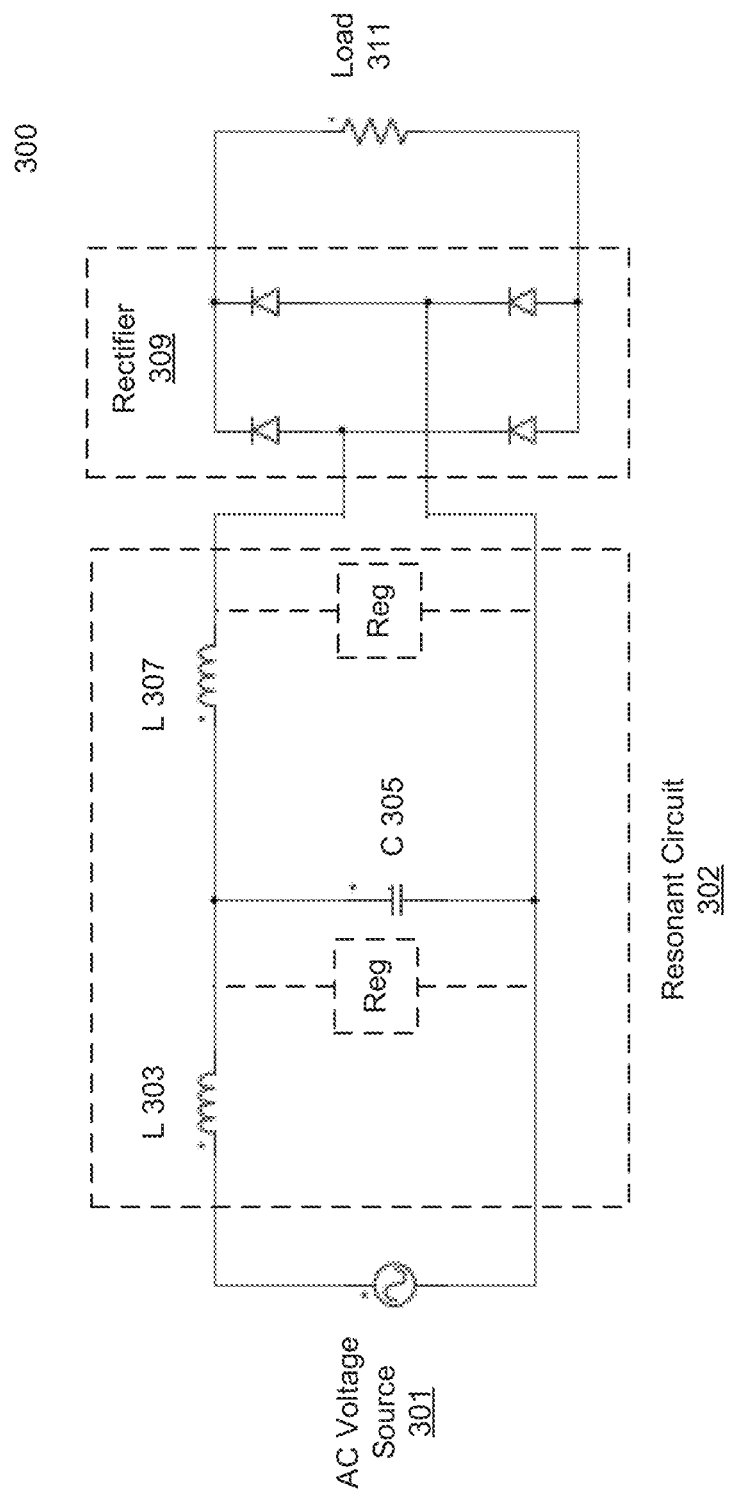
FIGS. 2A and 2B are schematic diagrams illustrating a single-phase true DC current source circuit according to certain embodiments of the invention.

FIG. 2A is a schematic diagram illustrating a single-phase true DC current source circuit according to one embodiment of the invention. In one embodiment, circuit 300 includes AC voltage source 301, a resonant circuit 302, and an AC/DC converter. AC voltage source 301 provides an AC voltage source to circuit 300. Resonant circuit 302 may be an LC resonant circuit (e.g., LC resonant circuit such as LCL or CLC resonant circuit) where the LC parameters are configured to cause the circuit to resonate at a frequency equal to the frequency of the AC voltage source 301. Resonant circuit 302 includes a first reactance 303, a second reactance 307, and a third reactance 305. The first reactance (inductor 303) is coupled to a first terminal of AC voltage source 301. The second reactance (inductor 307) is coupled to the first reactance (inductor 303) by a wye connection (e.g., four-wire circuit) or delta connection (e.g., three-wire circuit). The third reactance (capacitor 305) is coupled between the wye connection and a second terminal of AC voltage source 301. The rectifier or AC/DC converter 309 has a first input coupled to the second reactance (inductor 305) and a second input coupled to a second terminal of AC voltage source 301. Load 311 is coupled between a first and a second output of rectifier 309 to receive a constant DC current.

In electrical engineering, three-phase electric power systems have at least three conductors carrying AC voltages that are offset in time by one-third of the period. A three-phase system may be arranged in delta (Δ) or star (Y) (also denoted as wye). A wye system allows the use of two different voltages from all three phases, such as a 230/400 V system which provides 230 V between the neutral (center hub) and any one of the phases, and 400 V across any two phases. A delta system arrangement only provides one voltage magnitude, however it has a greater redundancy as it may continue to operate normally with one of the three supply windings offline, albeit at 57.7% of total capacity.

In one embodiment, referring back FIG. 2A, rectifier 309 may be a diode bridge, a rectifier bridge, or any switching circuits. In some embodiments, rectifier 309 may be a half wave or a full wave rectifier. In another embodiment, the first reactance and the second reactance are capacitors and the third reactance is an inductor. In another embodiment, load 311 may be a capacitive, reactive, resistive load, or a parallel/series combination thereof, or may be a subsequent stage of an electronic circuit, or a battery or DC source. By appropriately sizing the components to tune the LCL (inductor 303, capacitor 305, and inductor 307) resonant circuit to parallel resonance, the circuit delivers a true AC current through inductor 307 and therefore a true DC current to load 311. The DC current at load 311 is relatively constant such that the real power of load 311 (calculated by DC voltage multiplied by DC amperes) is a function of DC voltage across load 311. In other words, at the load terminals, in absence of any control circuitry, the DC voltage fluctuates as the impedance 311 is varied, while the DC current remains relatively constant.

The output resistor 311 can be increased or decreased from its nominal value. Since the circuit is a true current source the output current will remain constant and an increase of resistor 311 will result in an increase in output DC voltage and an increase in input AC current from the AC source in the same proportion above nominal value, and an increase in overall power. The inverse is true for a decrease in nominal resistance 311. An increase (or boost circuit topology) in DC voltage can be useful in some applications, and this is a method of using a current source to set the DC voltage to a desired nominal value rather than using more conventional means such as a transformer or DC/DC converters. A decrease in DC voltage (or buck topology) can also be useful for some applications such as high current rectifiers. The same principles apply for 3 phase circuits, described below.

Figure 12:
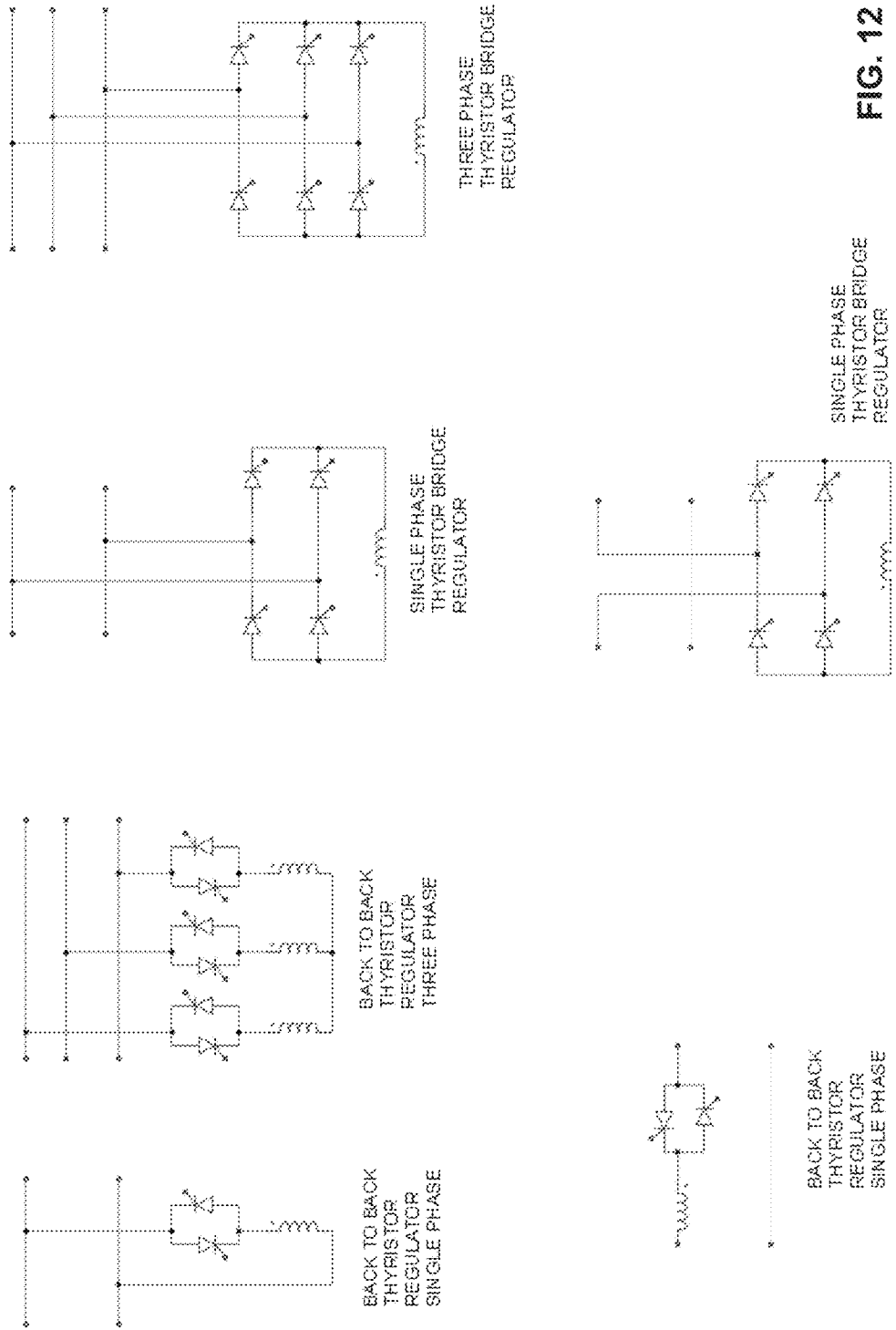
FIG. 12 shows examples of regulators that can be used with some embodiments of the invention.

In one embodiment, a regulator may be coupled to capacitor 305 (e.g., across in parallel with capacitor 305) to regulate the DC current, which in turn regulates the power or DC voltage at load 311. Alternatively, the regulator may be coupled to an input of rectifier 309. The regulator may be a single phase regulator implemented in a variety of ways as shown in FIG. 12.

Figure 2B:
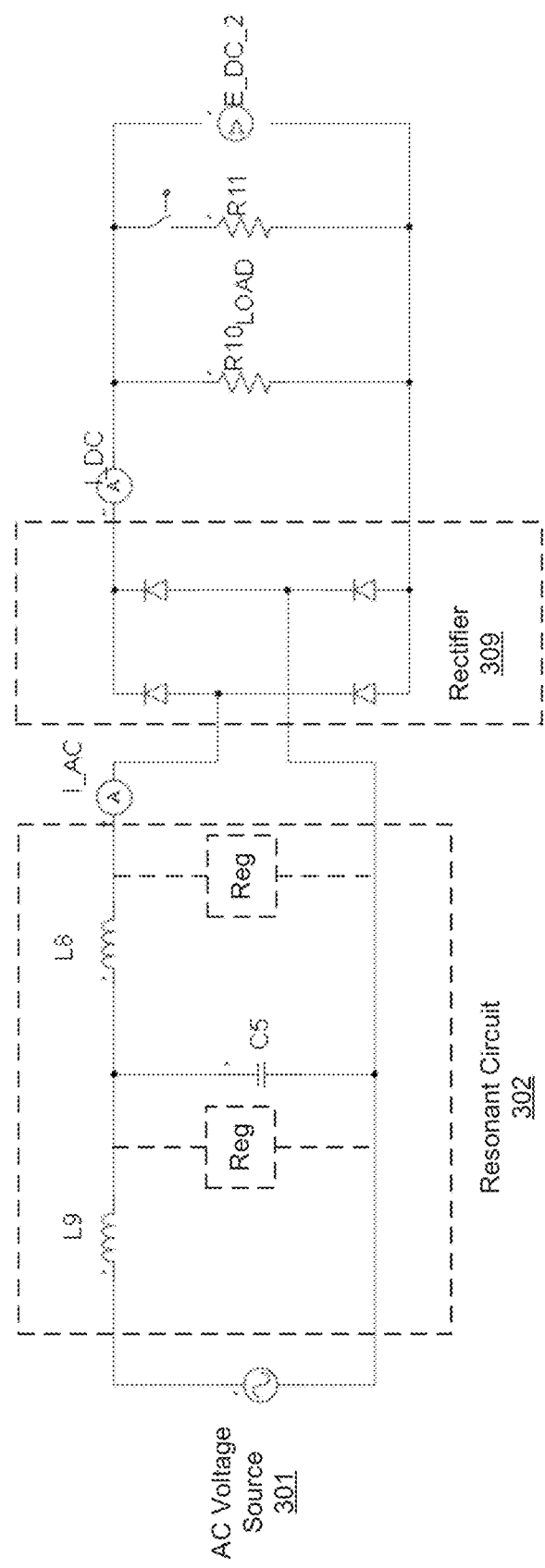
Figure 2C:
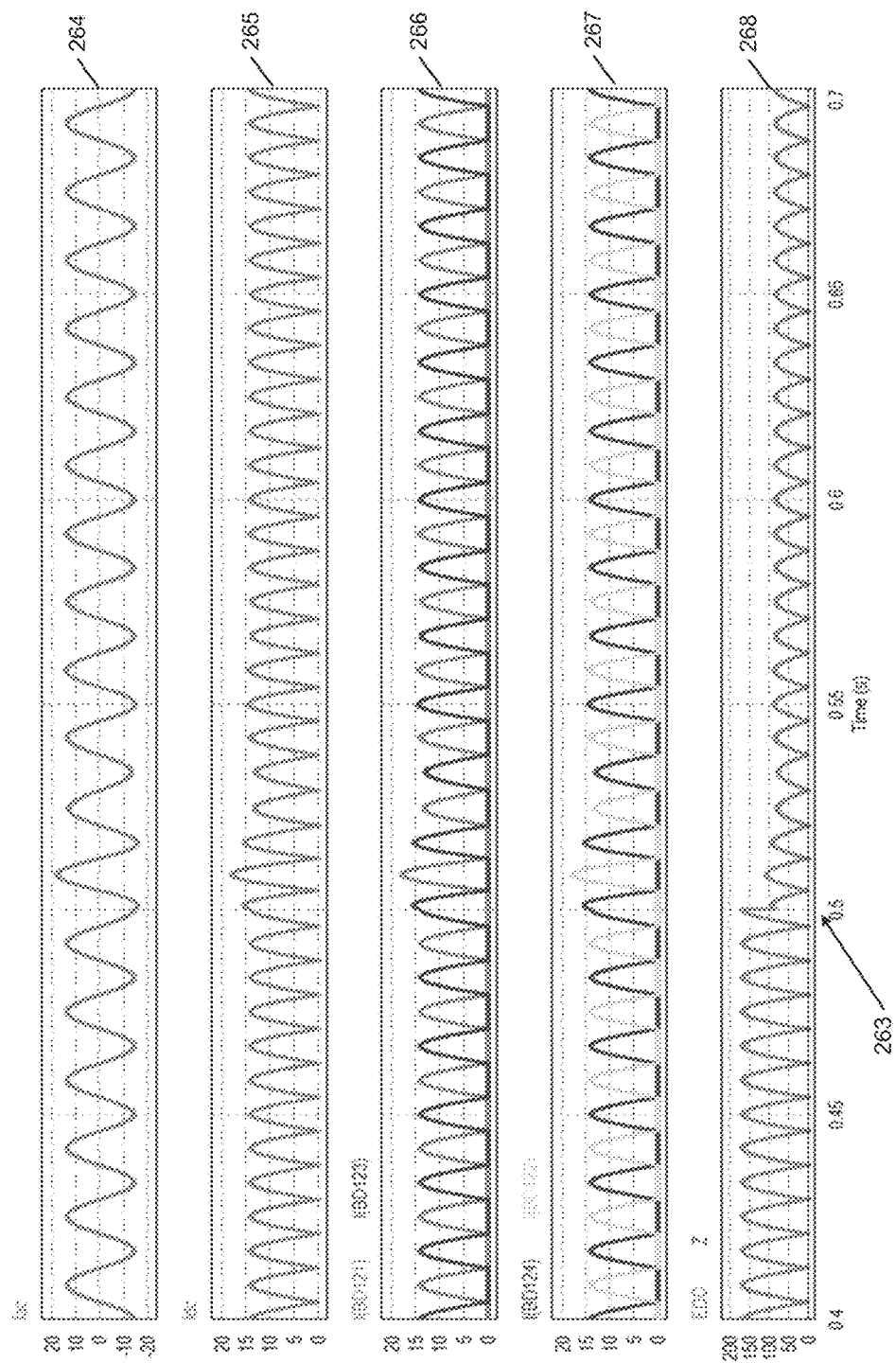
FIG. 2C shows waveforms of circuits as shown in FIG. 2B.

FIG. 2B is included to illustrate clearly the response of the circuit to a load variation of load 311. FIG. 2B is identical to FIG. 2A except there is a switch across the DC load 311 through an impedance of equal value to 311. Closing the switch will result in a half of the load resistance, and therefore a decrease in DC voltage for a constant DC current. At the instance switch S is closed the two output resistances combine to produce a resistance of half the value. Waveform 264 of FIG. 2C shows the current in L307. Waveform 265 shows the DC current into the combined load, waveform 266 and 267 show the current in the diode legs. Waveform 268 shows the DC voltage of the load. Switch S closes at 500 ms (point 263). Note that the essence of this embodiment of the invention is that it is a DC current source. Regardless of the position of switch S the DC current remains unchanged in steady state (waveform 265). The output DC voltage adjusts to a new steady state value according to ohms law (see point 263 of waveform 268).

Similar to FIG. 2A, in one embodiment, a regulator may be coupled to capacitor C5 (e.g., across in parallel with capacitor C5) to regulate the DC current, which in turn regulates the power or DC voltage at load R10. Alternatively, the regulator may be coupled to an input of rectifier 309. The regulator may be a single phase regulator implemented in a variety of ways as shown in FIG. 12.

Figure 3:
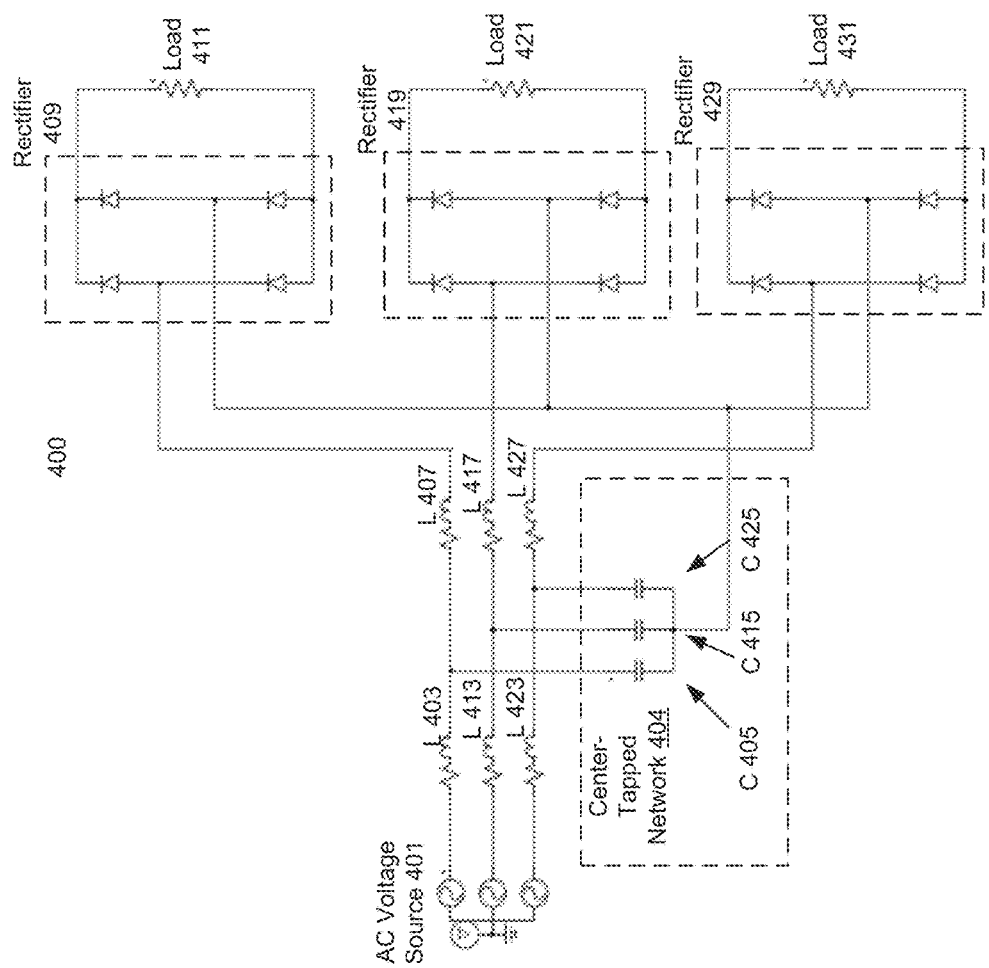
FIG. 3 is a schematic diagram illustrating a true DC current source circuit according to one embodiment of the invention.

FIG. 3 is a schematic diagram illustrating a circuit having three single-phase true DC output current sources according to one embodiment of the invention. Referring to FIG. 3, the circuit is useful in 3 phase source applications where loads 411, 421, 431 are unequal, or individual control of DC current in each load is necessary. In one embodiment, circuit 400 includes three-phase AC voltage source 401, a three-phase resonant circuit, and an inverter having three single-phase inverters. Resonant circuit includes reactance components 403, 405, 407 for a first phase, reactance components 413, 415, and 417 for a second phase, and reactance components 423, 425, and 427 for a third phase. The inverter includes rectifiers 409, 419, and 429, one for each of the three phases.

In one embodiment, a first reactance (inductor 403) is coupled to a first terminal of three-phase AC voltage source 401. A second reactance (inductor 407) is coupled to the first reactance (inductor 403) by a first wye connection. Center-tapped wye network 404, or second wye connection, having a third (capacitor 405), a fourth (capacitor 415), and a fifth (capacitor 425) reactance has a first terminal coupled to the first wye connection. Circuit 400 further includes a first single-phase rectifier (rectifier 409) having a first input coupled to the second reactance (inductor 407) and a second input coupled to a center tap of network 404. Load 411 is coupled between a first and a second output of rectifier 409 to receive a constant direct current.

Circuit 400 further includes a sixth reactance (inductor 413) coupled to a second input terminal of three-phase AC voltage source 401, a seventh reactance (inductor 417) coupled to the sixth reactance (inductor 413) by a third wye connection, coupled to a second terminal of network 404, and a second single-phase rectifier (rectifier 419) having a first input coupled to the seventh reactance (inductor 417) and a second input coupled to a center tap of network 404. Load 421 is coupled between a first and a second output of rectifier 419 to receive a constant direct current.

Circuit 400 further includes an eighth reactance (inductor 423) coupled to a third input terminal of three-phase AC voltage source 401, a ninth reactance (inductor 427) coupled to the eighth reactance (inductor 423) by a fourth wye connection, coupled to a third terminal of network 404, and a third single-phase rectifier (rectifier 429) having a first input coupled to the ninth reactance (inductor 427) and a second input coupled to a center tap of network 404. Load 431 is coupled between a first and a second output of rectifier 429 to receive a constant direct current. In another embodiment, loads 411, 421, and 431 may be capacitive, reactive, resistive loads, or a parallel/series combination thereof, or a battery, or may be subsequent stages of an electronic circuit.

In one embodiment, the first, second, and third rectifiers may be diode bridge rectifiers, thyristor bridge rectifiers, pulse-width modulation (PWM) rectifiers or any switching circuits. In another embodiment, the first, second, sixth, seventh, eighth, and ninth reactances are capacitive reactances or capacitors, and the third, fourth, and fifth reactances are inductive reactances or inductors.

In one embodiment, a regulator may be coupled to capacitor network 404 to regulate the DC current, which in turn regulates the power or DC voltage at the loads 411, 421, and 431. Alternatively, the regulator may be coupled to an input of rectifiers 409, 419, and 429. The regulator may be a three-phase regulator implemented in a variety of ways as shown in FIG. 12.

Figure 4:
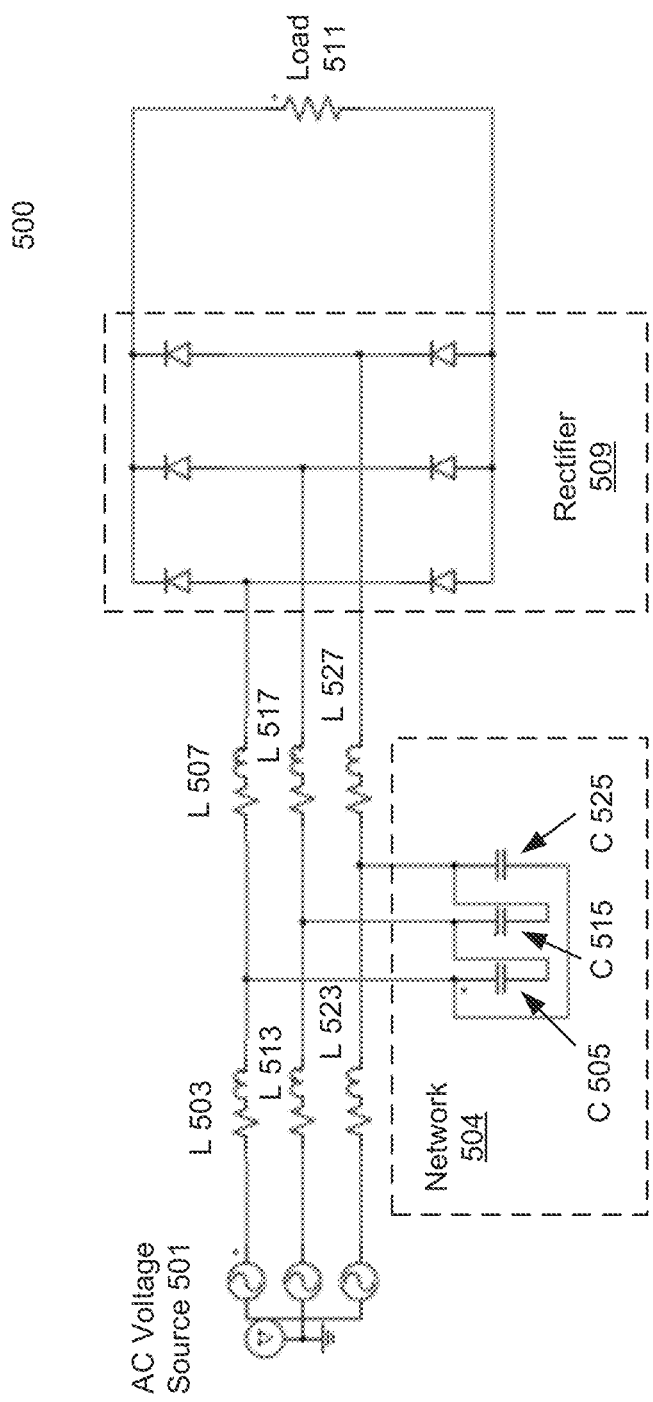
FIG. 4 is a schematic diagram illustrating a true DC current source circuit according to another embodiment of the invention.

FIG. 4 is a schematic diagram illustrating a true DC output current circuit having a three-phase input voltage source according to one embodiment of the invention. Circuit 500 includes three-phase AC voltage source 501. Circuit 500 includes AC voltage source 501, a three-phase resonant circuit, and a three-phase inverter 509. The three-phase resonant circuit includes reactance components 503, 505, and 507 for a first phase, reactance components 513, 515, and 517 for a second phase, and reactance components 523, 525, and 527 for a third phase.

In one embodiment, a first reactance (inductor 503) is coupled to a first terminal of three-phase AC voltage source 501. A second reactance (inductor 507) is coupled to the first reactance (inductor 503) by a first wye connection. Three-terminal network 504 includes a third (capacitor 505), a fourth (capacitor 515), and a fifth (capacitor 525) reactance connected in a delta configuration. Capacitors 505, 515, 525 may be connected in wye configuration (not shown). A first terminal of the three-terminal network is coupled to the first wye connection of circuit 500. Circuit 500 further includes AC/DC three-phase rectifier 509 having a first input coupled to the second reactance (inductor 507).

Circuit 500 further includes a sixth reactance (inductor 513) coupled to a second input terminal of the three-phase AC voltage source 501, a seventh reactance (inductor 517) coupled to the sixth reactance (inductor 513) by a second wye connection, coupled to a second terminal of the three-terminal network. Circuit 500 further includes an eighth reactance (inductor 523) coupled to a third input terminal of the three-phase AC voltage, a ninth reactance (inductor 527) coupled to the eighth reactance (inductor 523) by a third wye connection, coupled to a third terminal of the three-terminal network. Load 511 is coupled between a first and a second output of AC/DC three-phase rectifier 509 to receive a true constant direct current. In one embodiment, AC/DC three-phase rectifier 509 may be a diode bridge rectifier, a thyristor bridge rectifier, PWM rectifier or any switching circuits. In another embodiment, the first, second, sixth, seventh, eighth, and ninth reactances are capacitive reactances and the third, fourth, and fifth reactances are inductive reactances.

In one embodiment, a regulator may be coupled to capacitor network 504 to regulate the DC current, which in turn regulates the power or DC voltage at the load 511. Alternatively, the regulator may be coupled to an input of rectifier 509. The regulator may be a three-phase regulator implemented in a variety of ways as shown in FIG. 12.

Embodiment of Current Source Inverter as a DC Load

This section describes a method for how a true DC current source, as described above, can be inverted to create an AC voltage source. The DC source is a true current source. The DC current is inverted by a thyristor inverter and flows into an AC impedance consisting of a capacitor bank and resistor/inductor network. The AC capacitor bank is present to provide reactive power to the AC output network and assist in commutating the thyristors of the inverter. With appropriately sized elements on the AC side and conventional commutation sequence of the bridge thyristors, the DC current inverts to AC current and creates an AC voltage. The voltage can be three phase or single phase, depending on the inverter and load connected. The magnitude of the synthesized AC voltage, for a fixed DC current, is dependent on the sizing of the AC load (Resistor, inductor, capacitor). If the DC current is assumed to be constant, the DC voltage will depend on the magnitude of the real power of the connected load. The load reactive power will circulate between the AC capacitor bank and the AC inductance at no load (infinite load resistance), no real power exists therefore the DC voltage of the inverter is almost zero (supplying only stray losses). As the AC resistive load increases the DC voltage increases such that the power on the DC side of the inverter equals the AC real power (plus stray losses). At all times the DC current in the inverter remains unchanged, and the AC voltage is product of AC current multiplied by the impedance, Z, of the inverter.

In one embodiment, a second stage of the electronic circuit includes a DC-AC inverter coupled to a three-phase capacitor bank such that the DC-AC inverter converts a DC input signal to a three-phase AC output signal. The inverter may be thyristor inverter using force commutation or AC capacitor assistance, or it may be PWM insulated gate bipolar transistor (IGBT) inverter or any other switch plus a filter. The output of the inverter is connected to a three-phase load, which may be a subsequent stage of the electronic circuit.

Figure 5A:
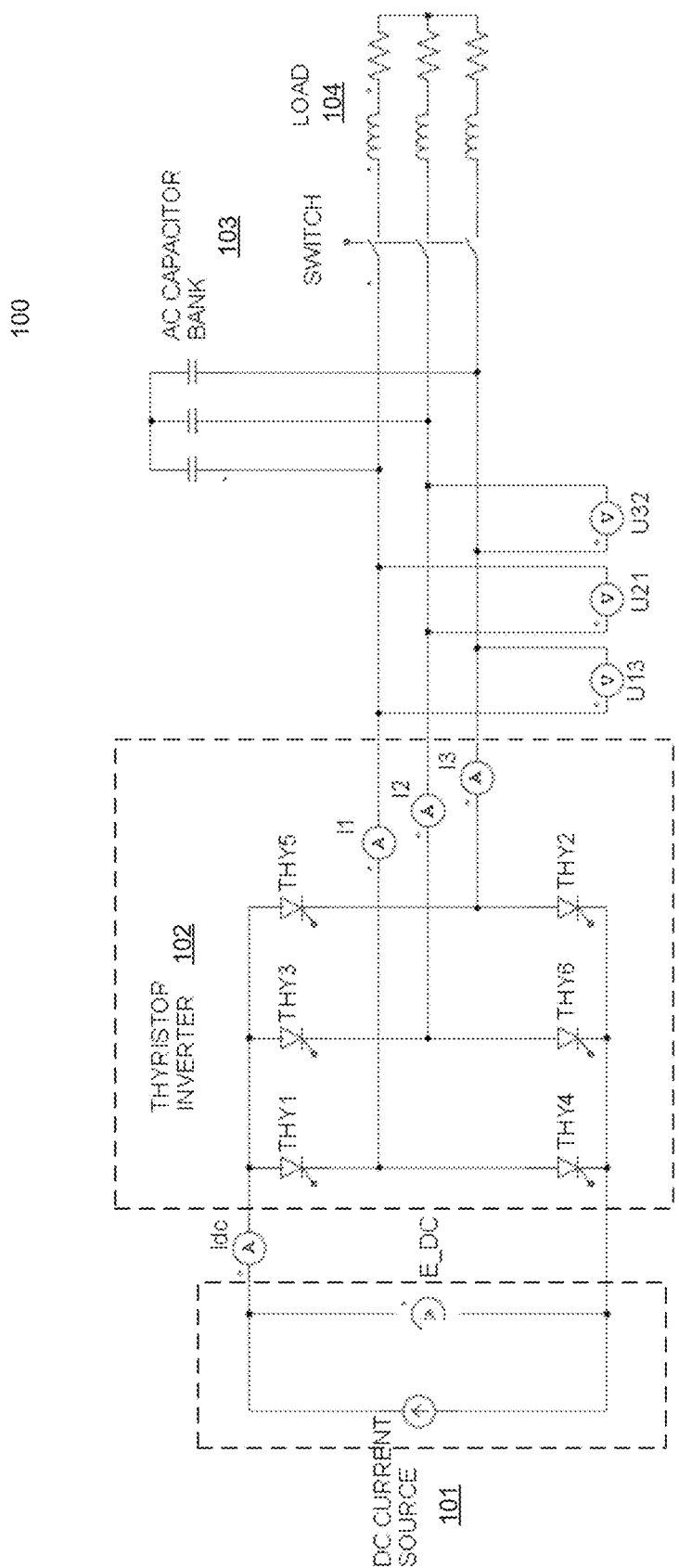
FIGS. 5A and 5B are schematic diagrams illustrating a DC-AC power converter according to certain embodiments of the invention.
Figure 6:
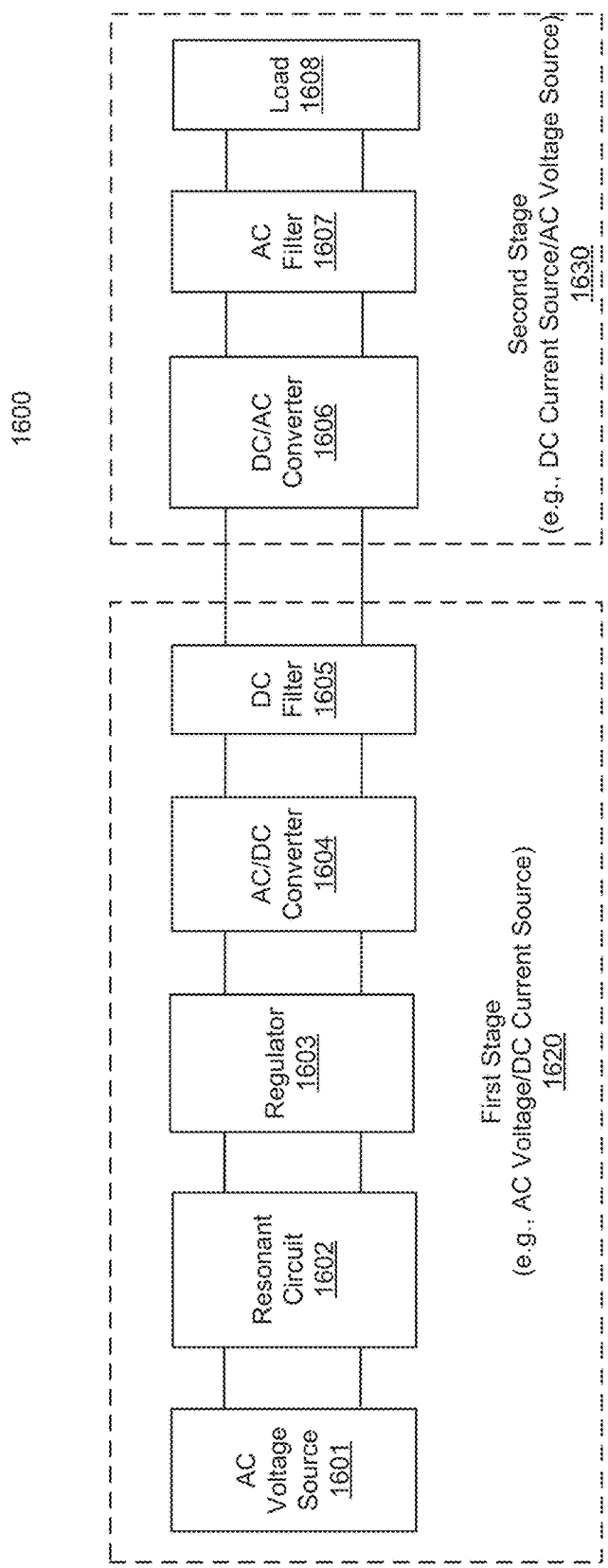
FIG. 6 is a schematic diagram illustrating a three-phase DC-AC converter circuit according to one embodiment of the invention.

FIG. 5A is a schematic diagram illustrating a DC-AC power converter according to one embodiment of the invention. The DC-AC power converter may be a second stage of a two-stage electronic circuit to complete a true current source inverter electronic circuit, for example, as shown in FIG. 6. For example, DC current source 101 includes a true DC current source provided by an AC-DC power converter electronic circuit, such as electronic circuits of FIGS. 2A-2B and 3-4. Referring to FIG. 5A, electronic circuit 100 includes a true DC current source 101 connected to the DC poles of three-phase thyristor inverter or thyristor bridge 102 operating as an inverter (e.g., a three-phase inverter). DC current source 101 may represent any of the true DC current sources as described above. AC capacitor bank 103 is connected to AC terminals of the thyristor inverter 102. Three-phase load 104 is connected in parallel with capacitor bank 103. By commutating, or switching on and off, six thyristors of thyristor inverter 102 in a conventional progression, i.e., THY1, THY3, THY5, for the top row of devices and THY4, THY6, THY2 for the bottom row of devices, a DC current is commutated to create an AC current to form a three-phase AC voltage across AC terminals of inverter 102, each phase voltage 120 degrees apart. The phase to phase voltage on the AC side of the inverter bridge provides the means of commutation of the thyristors (AC capacitor bank assisted commutation).

For example, gate terminals of thyristors of thyristor inverter 102, such as THY1, may be coupled to a pulsing circuit or gate driver or controller (not shown) configured to pulse at predetermined intervals to control the thyristors' switching time to output a pulse width modulated (three-phase AC or sinusoidal signals) at the output terminals. The gate driver switching interval regulates the output frequency and phase angles between the three-phase AC signals. Note that no feedback circuit is required to produce the output sinusoidal voltage waveform. The gate driver/controller may include a machine-readable medium (e.g., memory) storing a switching or firing algorithm to turn on or turn off the thyristors according to a predetermined firing scheme.

Figure 5B:
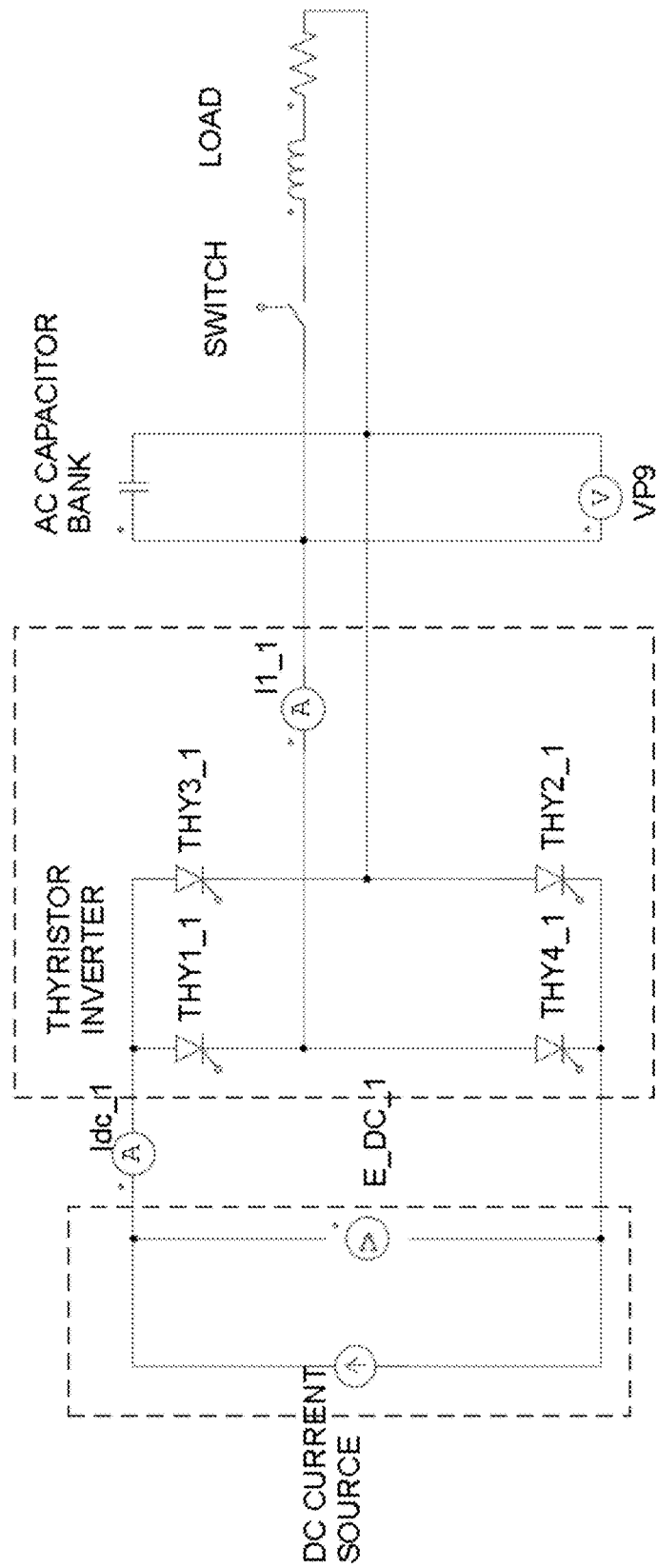

The amplitude of AC voltage across load 104 is determined by the impedance of capacitor bank 103, load 104, and a magnitude of the DC current of source 101. The DC current of DC current source 101 remains relatively unchanged, irrespective of load changes in 104. A load change is characterized by a change in DC voltage. In other embodiments, load 104 may be capacitive, resistive, or a subsequent stage of an electronic circuit. In other embodiments, the DC source current may be variable, providing a method to control the AC voltage. Capacitor bank 103 may be connected in delta or wye configuration. Capacitor bank 103 may be tuned to provide reactive power compensation, i.e., capacitor bank 103 corrects power factor to increase real power delivered to load 104. In another embodiment, the power converter of FIG. 5A (102) may be a single phase thyristor inverter with 180 degrees of conduction angles for each pair of inverters of the single phase thyristor inverter as shown in FIG. 5B.

In one embodiment, a three-phase transformer may be coupled between AC capacitor bank 103 and load 104 of FIG. 5A for the purpose of isolating load 104 from the AC capacitor bank. A single-phase transformer may be coupled between the AC capacitor bank and the load in FIG. 5B to isolate the AC capacitor bank and the load.

Figure 5C:
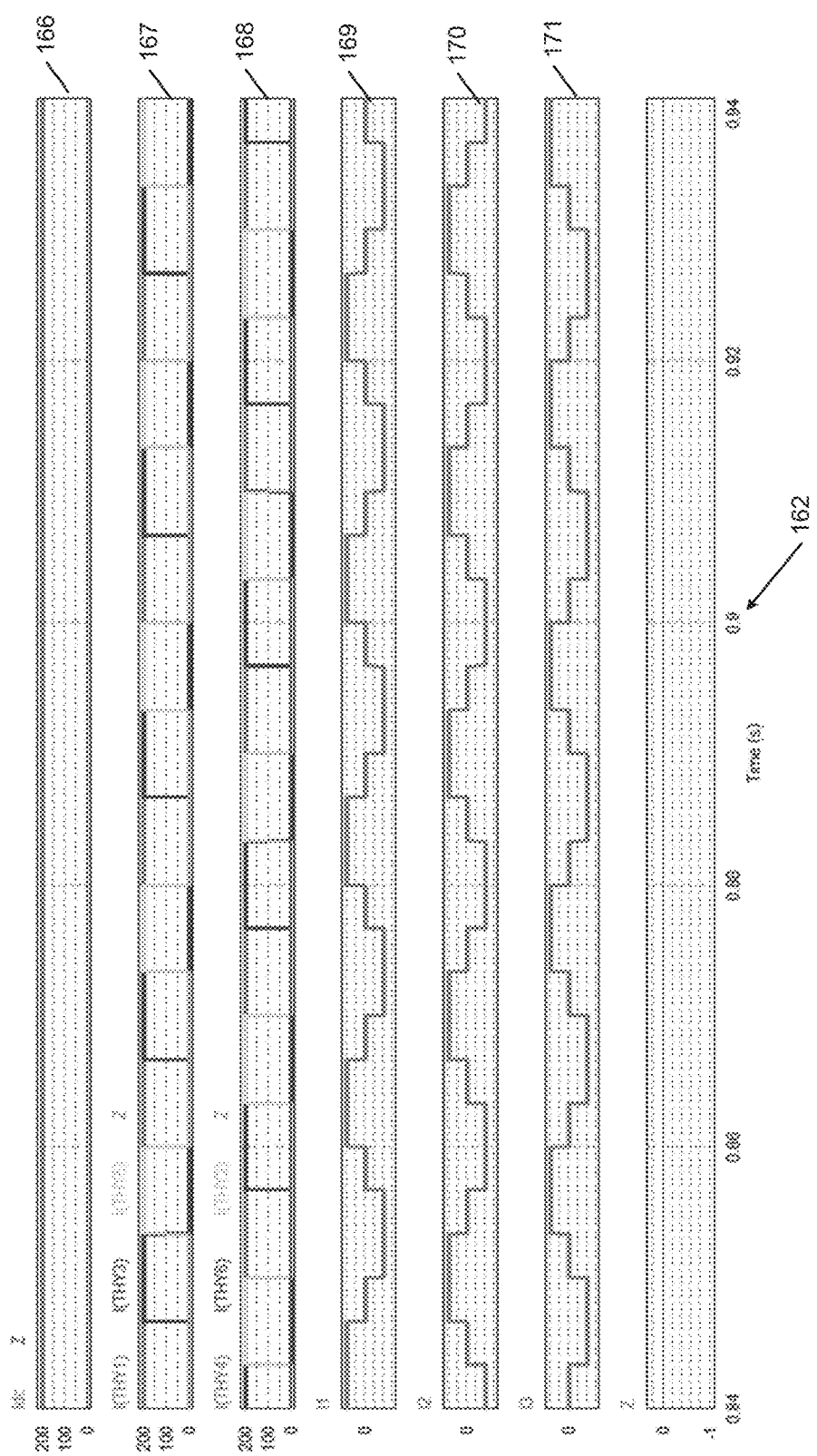
FIGS. 5C and 5D show waveforms of circuits as shown in FIGS. 5A and 5B.
Figure 5D:
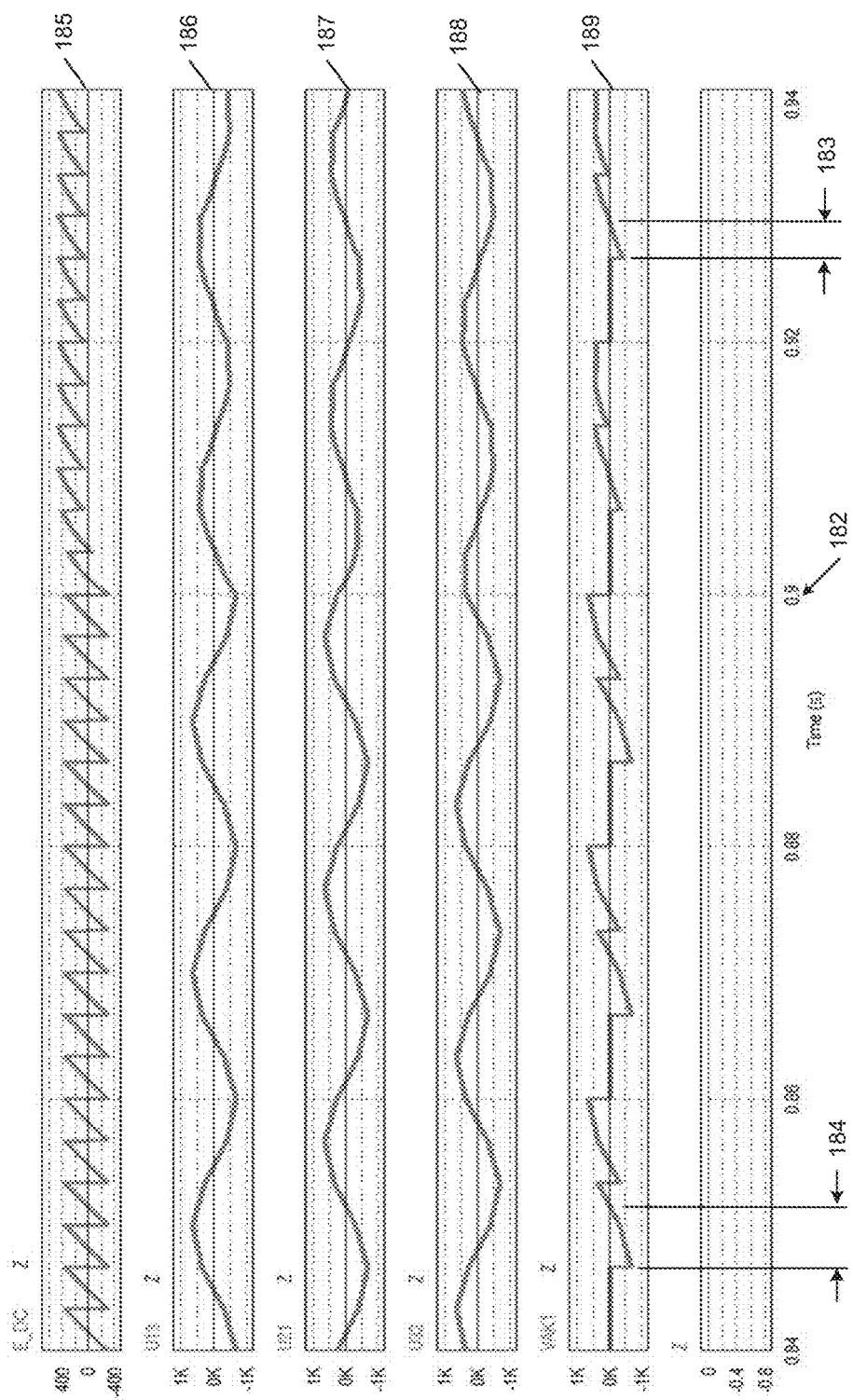

FIGS. 5C and 5D show the waveforms associated with the circuit of FIG. 5A. Note that there is no change of DC current in this example. The DC current is constant. For illustration the switch closes at 900 ms (point 162), showing the transient of the various measurements of AC and DC voltage and current when the circuit switches from a no load condition into a full load condition. The thyristor switches in this case are switched in an open circuit control fashion, in a basic conventional sequence described above, see waveforms 167, 168). Closing of switch S at 900 ms does not have an effect on any of the current waveforms (166, 167, 168, 169, 170, and 171). Since the DC current is a true constant source, the DC and AC current waveforms remain unaltered (166, 169, 170, and 171). The AC voltage generated is 3 phase, 120 degrees apart sinewave (see 186, 187, 188), synthesized by the current passing through the impedance of the AC capacitor bank. The voltage waveform across the capacitor is an integral of the current waveform from the formula $v(t)=(1/C)*integral(i(t)*dt)$.

The DC voltage, waveform 185, experiences a step at 900 ms (point 181). The DC voltage and current are now both nonzero values and the source is delivering real power (watts) to the load, 104. The AC voltages, waveforms 186,187,188 experiences an alteration of waveform because of the parallel connected load impedance which shares the AC current with the capacitor bank in ratio of their complex ohmic values. Waveform 189 shows the anode-cathode voltage of thyristor 1. As can be seen the reverse voltage duration, after device turn off, applied to the thyristor before and after 900 ms are not equal. BetaNL (184) is larger than BetaFL (183), meaning for the same AC voltage the DC voltage must have increased. This occurs naturally (no control loop) in order to respect the laws of thyristor rectifier and inverter circuits in relation to the relationship between their respective AC and DC quantities. (further explanation and definitions of this are beyond this paper). Maximum and minimum beta quantities must be respected in order to produce a reliable converter design and would be taken into account when sizing the elements of this inverter.

In another embodiment, referring back to FIG. 4, load 511 may be a capacitive, reactive, resistive load, battery, DC source or a combination thereof. In some embodiments, load 511 may be a second stage of an electronic circuit. For example, load 511 may include a DC/AC converter. The DC/AC converter may be force commutated thyristor, AC capacitor bank assisted thyristor commutation, or PWM IGBT, gate turn-off (GTO), or other turn off device switch plus a filter, or any other switches.

FIG. 6 is a block diagram illustrating an example of an AC/DC plus DC/AC converter according to one embodiment of the invention. FIG. 1600 may be single phase or three phase or a mixture of both. First stage 1620 may be single phase and second stage 1630 may be three phase, or first stage 1620 may be three phase and second stage 1630 may be single phase. Referring to FIG. 6, the converter 1600 includes first stage circuit 1620 and second stage circuit 1630. First stage circuit 1620 may represent any of the AC voltage source to DC current source circuit as described above, including the circuits as shown in FIGS. 2A-2B, 3-4, and 5A-5B. First stage circuit 1620 includes an AC voltage source 1601, a resonant circuit 1602, an optional regulator 1603, an AC/DC converter 1604, and an optional DC filter 1605. Resonant circuit 1602 may be an LCL or CLC resonant circuits as described above.

Regulator 1603 may be positioned after the resonant circuit 1602 (shown) or across the wye point of resonant circuit 1602. That is to say, across capacitor 305 in FIG. 2A or across the network 504 in FIG. 4. Regulator 1603 may be series connected or shunt connected. Regulator 1603 may be a back to back SCR connected in series or shunt, with an optional series inductance. Regulator 1603 may be a 3 phase thyristor bridge or 3 single phase thyristor bridges connected in series or in shunt. Regulator 1603 may be back to back IGBTs connected in series or shunt with an optional series inductance. Regulator 1603 may be PWM back to back IGBTs plus a filter, connected in series or in shunt. Regulator 1603 may be any other back to back connected device (switch), connected in series or shunt. Examples of these regulators are shown in FIG. 12. AC/DC converter 1604 may include a rectifier such as diode bridge rectifier(s). 1604 may be a PWM rectifier plus AC filter. DC filter 1605 may include one or more inductors and DC capacitors connected in series and shunt. In one embodiment, second stage circuit 1630 includes a DC/AC converter or inverter 1606, an optional AC filter 1607, and load 1608. DC/AC converter 1606 may include a thyristor bridge that is force commutated or AC capacitor bank assisted (line commutated). 1606 may be a PWM IGBT inverter, or any other turn off device such as GTO. 1607 may be a capacitor bank or filter. The load may or may not include a series transformer. In one embodiment, a transformer may be positioned between AC filter 1607 and load 1608 for isolation purpose.

Figure 7A:
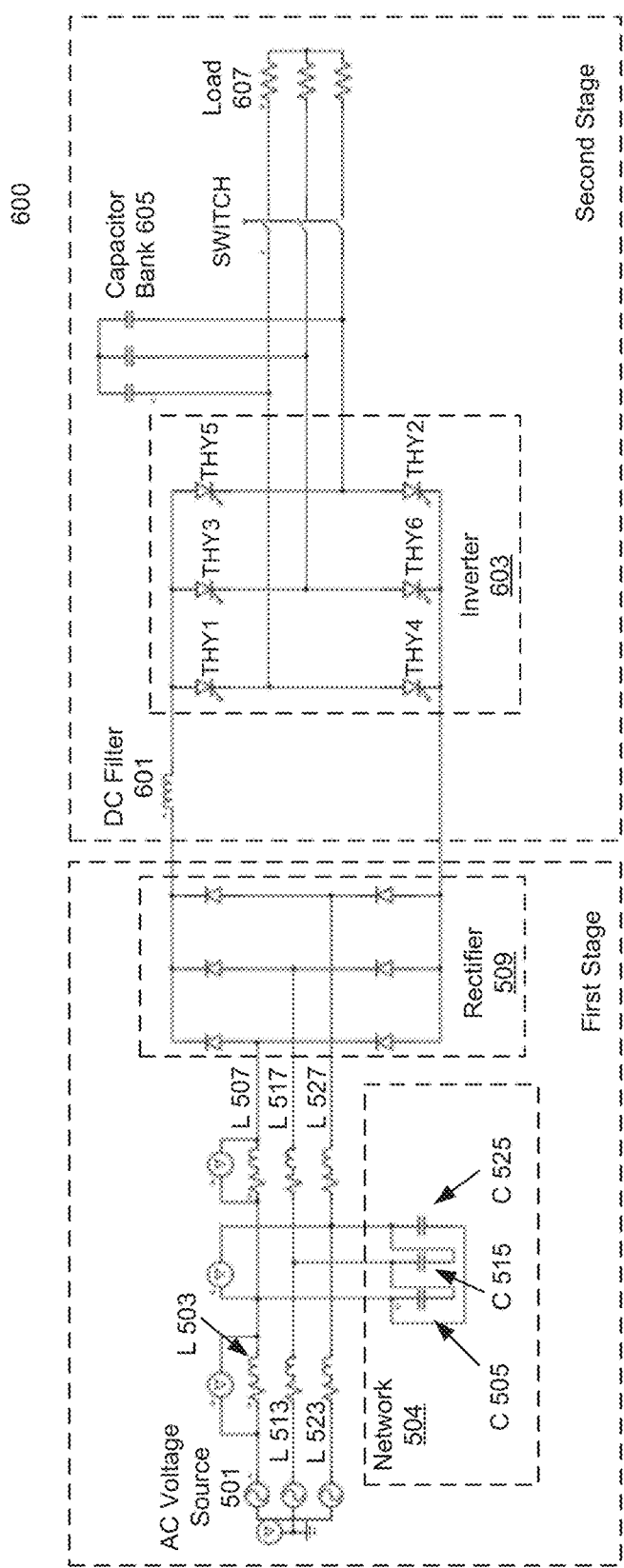
FIGS. 7A-7C are schematic diagrams illustrating a three-phase DC-AC converter circuit according to some embodiments of the invention.

Referring now to FIG. 7A, circuit 600 includes two stages of an electronic circuit. The first stage may represent first stage 1620 and the second stage may represent second stage 1630 of FIG. 6. The first stage of circuit 600 may be an AC/DC converter circuit 500 of FIG. 4. The second stage of circuit 600 may include DC filter 601 coupled to DC/AC converter or thyristor inverter 603 (such as inverter 102 of FIG. 5A) converting DC input signals to AC output signals. Load 607 is coupled to the output terminals of circuit 600, and three-phase capacitor bank 605 is coupled between the output terminals of DC/AC converter 603, and load 607.

In one embodiment, DC/AC converter 603 is a three-phase six pulse thyristor bridge, or an insulated-gate bipolar transistor (IGBT) inverter using PWM, or any switching circuit. In another embodiment, capacitor bank 605 includes three capacitive reactances connected in a delta configuration. In another embodiment, capacitor bank 605 includes three capacitive reactances connected in a wye configuration. In another embodiment, load 607 may be a capacitive, reactive, resistive load, or a combination thereof, or may be a subsequent stage of an electronic circuit. In some embodiments, inverter 603 may be a diode converter, a thyristor converter, or any switching circuits. In some embodiments, inverter 603 may be a full wave or a half wave rectifier. In one embodiment, DC filter 601 includes an inductive reactance. In another embodiment, DC filter 601 is a pass through wire, e.g., no filtering.

With the techniques described throughout this disclosure, some typical shortcomings of thyristor inverters may be avoided by using a constant DC current rather than constant DC voltage. Some of the advantages include that the output voltage frequency is controlled easily by altering the commutating period. Adjusting the DC current is a simple means of control and regulation of the output voltage. Frequency and phase are determined by the period and pattern of the firing sequence. By appropriately sizing the components (AC and DC) commutation failure should be avoided. If failure does happen the fault current is limited by the DC source and therefore can be recovered. Since the inverter is boost topology adjustment of the capacitor bank can be made to select the correct AC load voltage for the load for a specific application, possibly eliminating output isolation transformer. Input THID and PF are good regardless of load due to the tuned resonant circuit. The techniques can be utilized in AC voltage source of variable frequency, phase, or magnitude (or all), such as variable speed drive, UPS, and SFC. For UPS the variable DC bus voltage will need a variable DC source.

In one embodiment, a regulator may be coupled to or across capacitor network 504 or alternatively, the regulator may be coupled an input of rectifier 509 to regular the DC current which in turns regulate the DC voltage supplied to the second stage. In another embodiment, a transformer may be positioned between capacitor bank 605 and load 607 for isolation purposes.

DC Current Source Conversion to DC Voltage Source

Figure 7B:
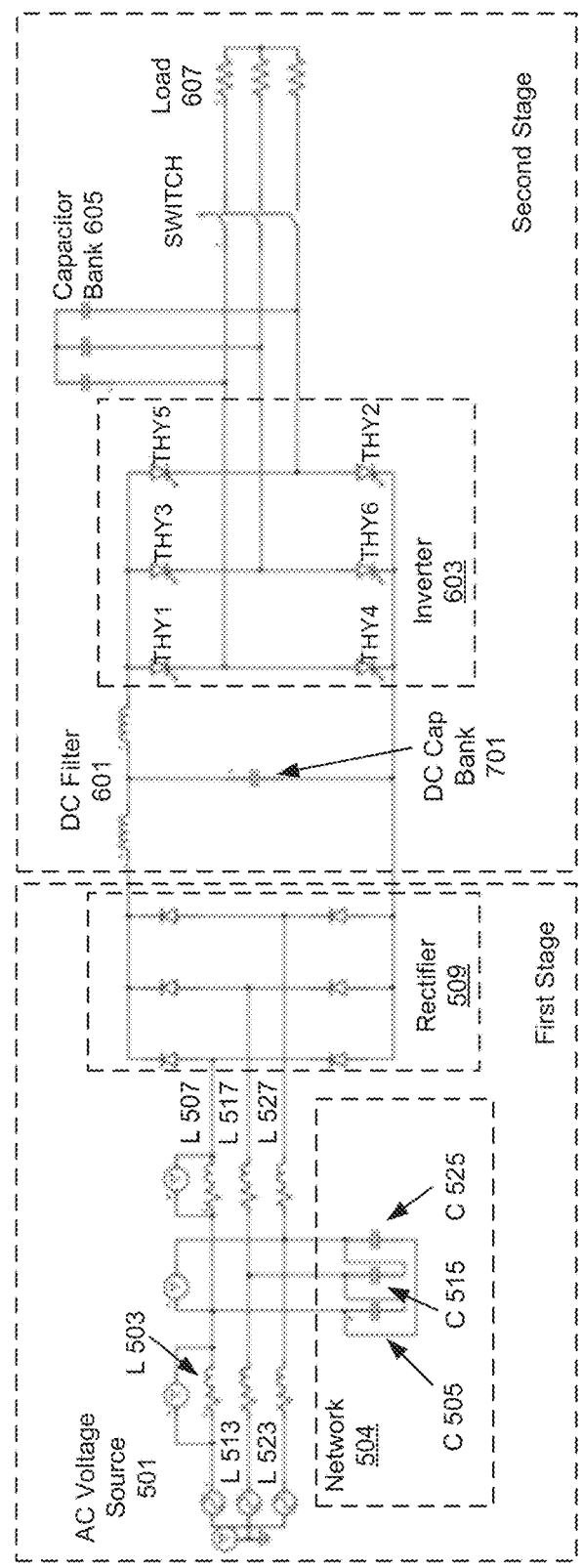

Referring now to FIG. 7B, circuit 600 includes a first stage circuit and a second stage circuit. The first stage circuit may represent first stage 1620 and the second stage circuit may represent second stage 1630 of FIG. 6. Circuit 600 may include DC capacitor bank 701 such that DC capacitor bank and DC filter 601 are configured in an inductor-capacitor-inductor wye or T network. The introduction of a DC capacitor bank decouples the AC load voltage to the AC supply voltage, or the first and second stages. This can be advantageous if the input and output frequencies are not equal. Also, the DC capacitor bank will provide a DC voltage of lower ripple than a purely inductive DC filtering. If the DC current source can be regulated, the voltage across the DC capacitor bank can be set to any desired voltage value.

By appropriately designing and sizing the elements of a true current source rectifier described previously (such as circuits of FIGS. 3-5, or a first stage circuit of FIGS. 6-7) and according to appendix A to regulate a DC output current to set a desired DC voltage across the output, conventional equations governing the ratio between AC and DC voltage for voltage source diode, thyristor, and/or IGBT rectifiers can be ignored, allowing more flexibility in power converter circuit designs, especially for backup power supplies where a regulated DC energy source is required and is connected in paralleled with another DC source of any voltage. Being able to boost or buck the output voltage by regulating the DC true current source provides an alternative means of voltage regulation and alleviates the need for more conventional technologies such as isolation transformers, autotransformers or DC/DC converters. This can be considered a new kind of rectifier where selection of the components LCL and their ratings can transform a low voltage AC network into a high voltage DC network without the use of conventional means such as isolation transformers, phase control bridges, DC/DC converters, and autotransformers.

For example, in a typical 400V AC supply system the maximum no load DC voltage that can be obtained by a conventional three-phase diode bridge without the use of a supply transformer is typically around 540 VDC at no load. A thyristor rectifier is limited to the same maximum voltage but can obtain a large DC voltage range by phase control of the switching sequence firing the thyristor devices. However this will result in poor power factors, voltage regulations, and/or harmonics. A DC voltage generated by a true DC current source power converter, without the use of any power transformers, as described above does not have any limitations in maximum DC voltage. Also, the DC voltage may be regulated and controlled over a large range while at the same time does not pose poor the input power factors and harmonics problems of conventional bridges. Proposed methods of regulation and control are dealt with in the next chapter.

This method uses a true current source passed through a dc load to achieve the desired DC voltage. This means conventional means of using transformers and sophisticated power electronics (such as DC-DC converters) are all avoided. Additionally the typical supply elements that are judged by supply authorities, such as THID and THVD and PF are well within statutory limits. Conventional methods would not achieve this without harmonic filters and power factor correction. The techniques can be utilized UPS, SOLAR, or any application that requires a DC energy source such at battery, ultra capacitors and solar.

In one embodiment, a regulator may be coupled to or across capacitor network 504 or alternatively, the regulator may be coupled an input of rectifier 509 to regular the DC current which in turns regulate the DC voltage supplied to the second stage. In another embodiment, a transformer may be positioned between capacitor bank 605 and load 607 for isolation purposes.

Figure 7C:
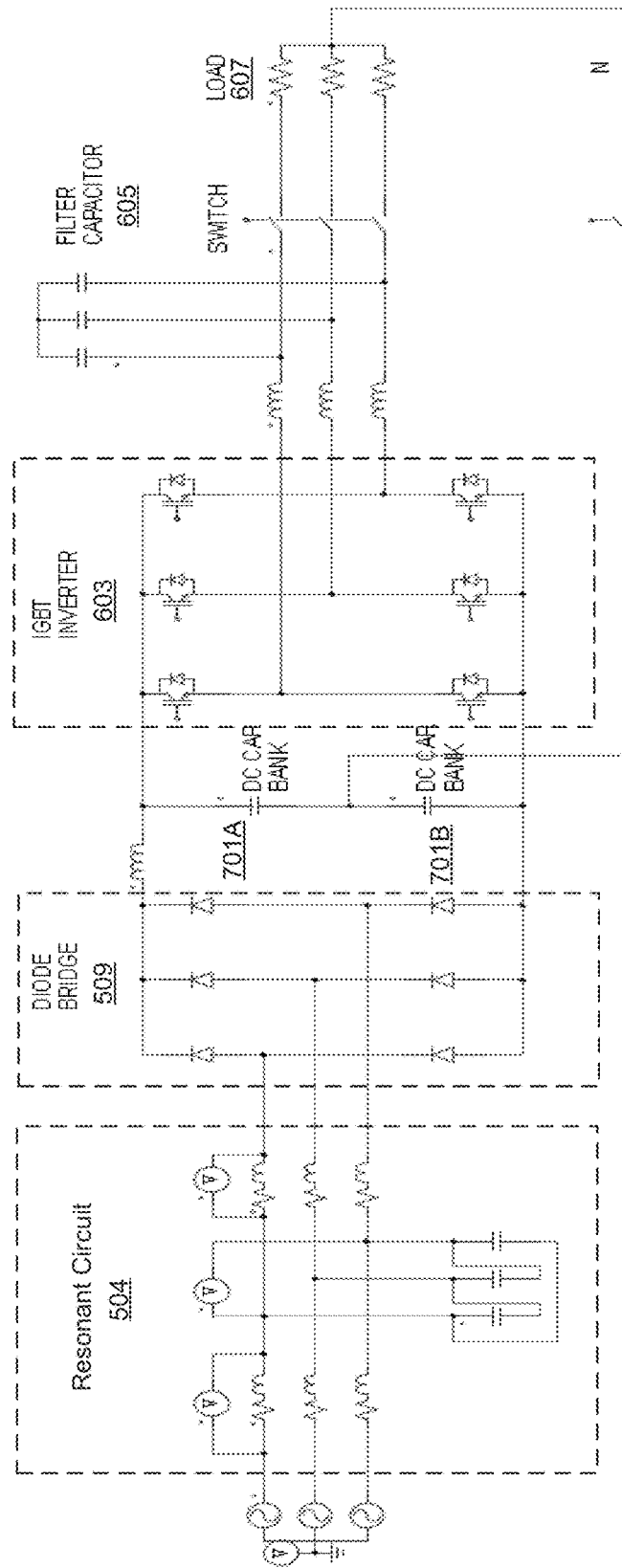

FIG. 7C is a schematic diagram illustrating a three-phase DC-AC converter circuit according to another embodiment of the invention. Referring to FIG. 7C, the circuit is similar to the ones as shown in FIGS. 7A and 7B, except that the inverter is an IGBT inverter. In addition, the DC capacitor bank includes DC capacitor bank 701A and DC capacitor 701B in series. The middle point of DC capacitor banks 701A-701B is connected to a common point of load. A regulator may be coupled to or across capacitor network 504 or alternatively, the regulator may be coupled an input of rectifier 509 to regular the DC current which in turns regulate the DC voltage supplied to the second stage. In another embodiment, a transformer may be positioned between capacitor bank 605 and load 607 for isolation purposes.

Regulation of AC and DC Elements

Figure 8:
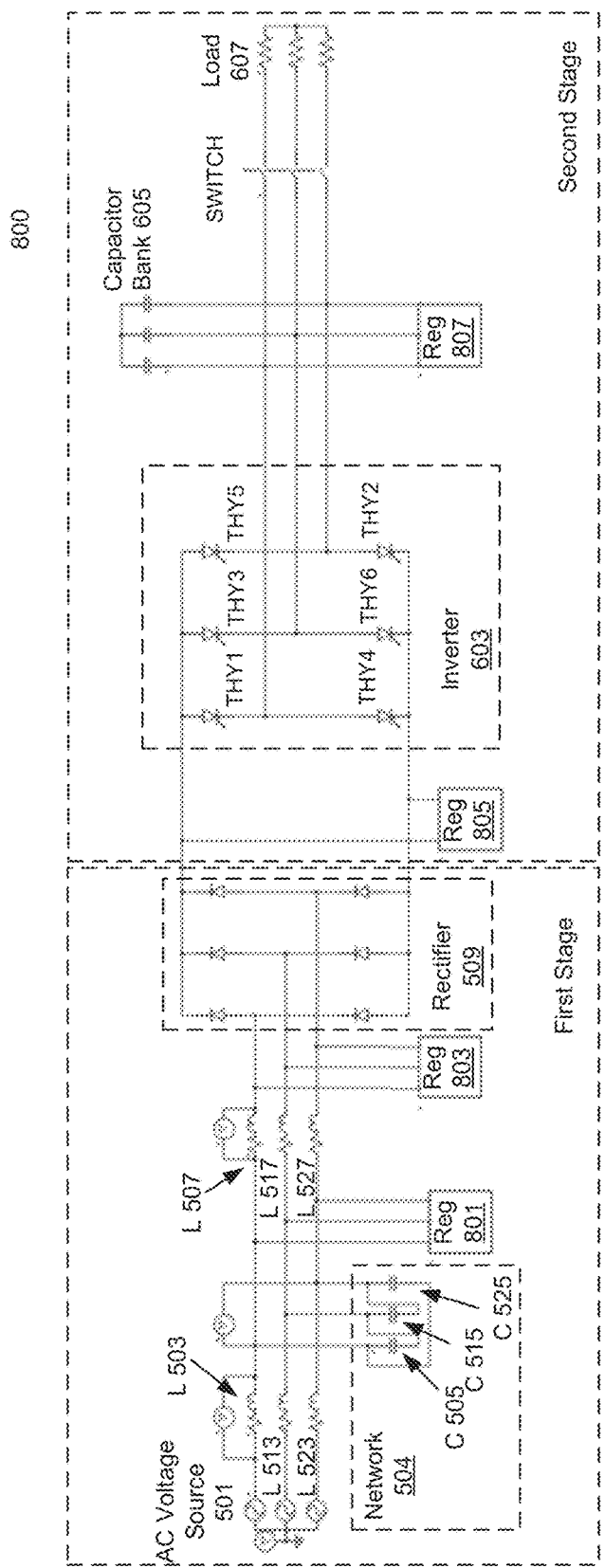
FIG. 8 is a schematic diagram illustrating a three-phase DC-AC converter circuit having one or more voltage regulators according to one embodiment of the invention.

In some embodiments, one or more regulators may be coupled at various locations of the power converter circuits/system to regulate a voltage or a current at the various locations. Referring to FIG. 8, circuit 800 may represent circuit 600 of FIG. 7A. Circuit 800 may include any of regulators 801-807 coupled at various locations of circuit 800 to regulate a current flow by means of series or shunt connection. A shunt connection prevents current generated by the source reaching the load by diverting it through a parallel path. In one embodiment, a three-phase regulator, such as regulator 801, is coupled to the first stage of circuit 600, at the three terminals of network 504. In one embodiment, three-phase regulator 803 is coupled to inputs of rectifier 509.

In another embodiment, a single-phase regulator, such as regulator 805, is coupled to outputs of rectifier 509. In one embodiment, a regulator, such as regulator 805, may be coupled to outputs of a DC filter (not shown), such as DC filter 601 of FIG. 7A. In another embodiment, a three-phase regulator, such as regulator 807, is coupled to input terminals of capacitor bank 605 with the beta of inverter 603 fixed (this is required due to the fixed DC voltage, to produce a regulated AC voltage). Using regulator 807 as an inductive device diverts current that would otherwise pass through to the inverter capacitor bank 605 to regulate the AC voltage at the terminals of inverter 603. An example of regulator 807 may be a 6 pulse thyristor bridge that operates at a fixed alpha angle of 90 degrees from its supply voltage. Since the inverter is regulating AC voltage, the excess reactive current that is not circulating in the load or drawn by the inverter will be forced into regulator 807. In another embodiment, a transformer may be positioned between capacitor bank 605 and load 607 for isolation purposes.

Figure 9:
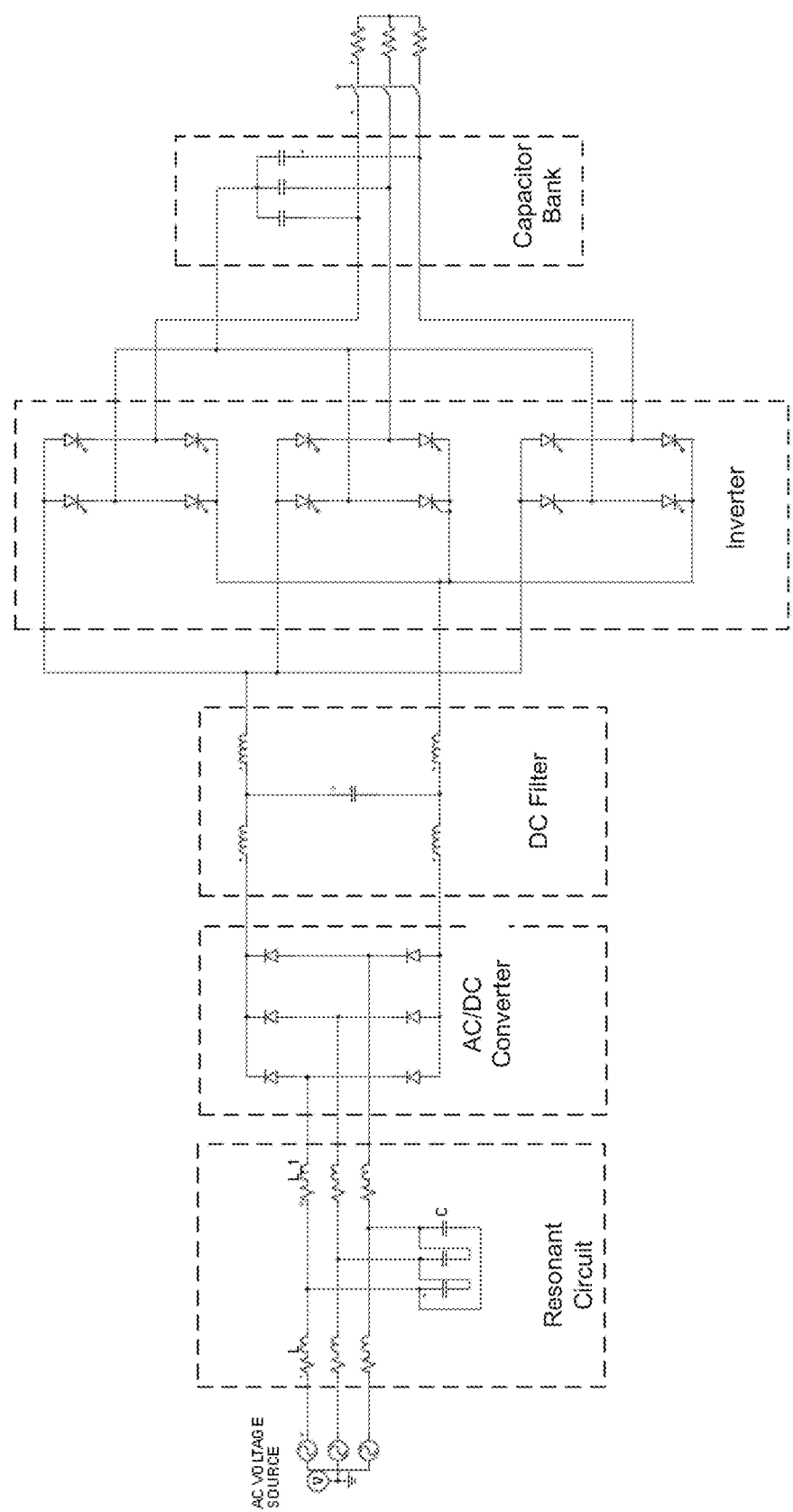
FIG. 9 is a schematic diagram illustrating a three-phase DC-AC converter circuit according to another embodiment of the invention.
Figure 10:
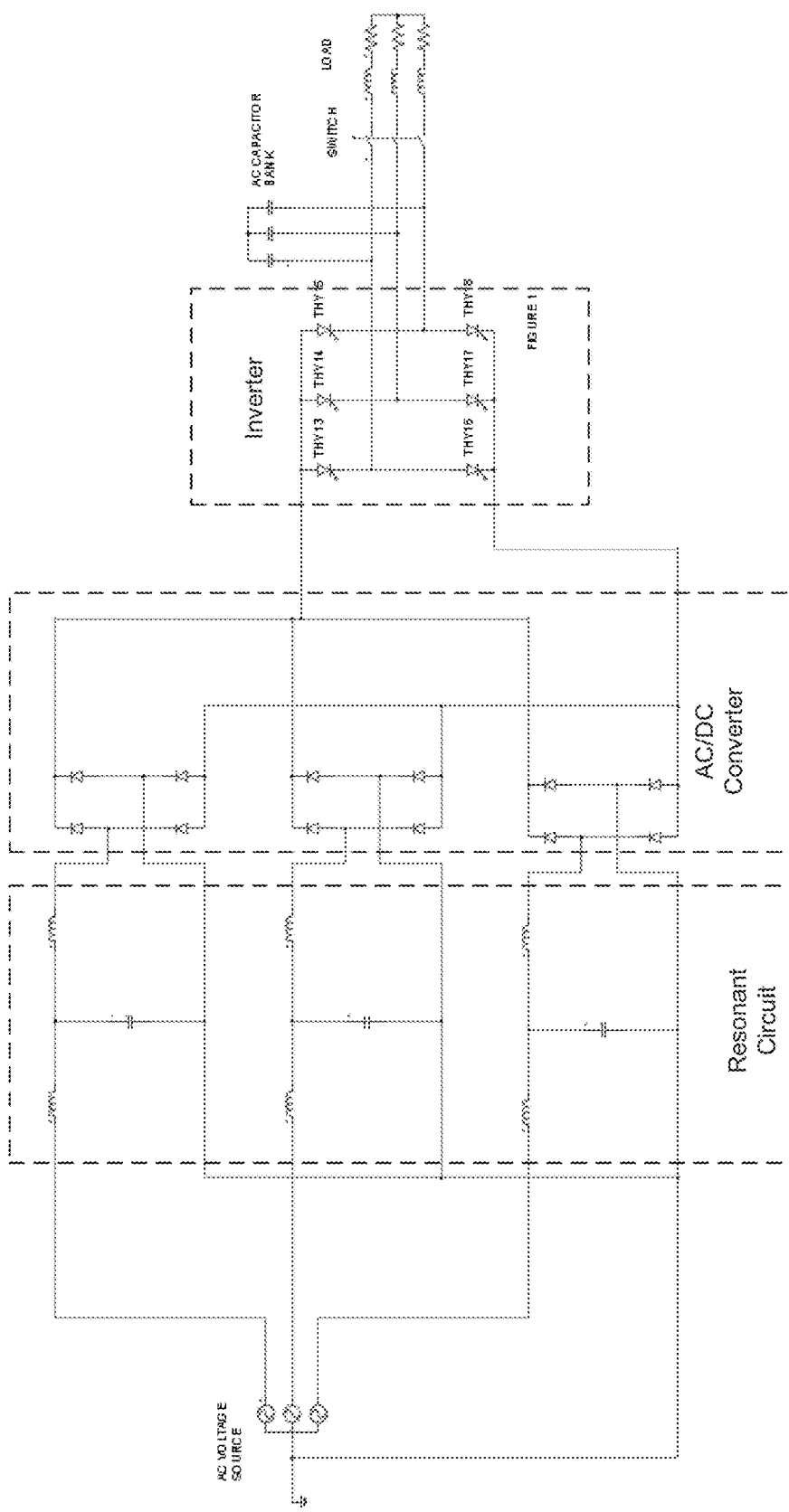
FIG. 10 is a schematic diagram illustrating a three-phase DC-AC converter circuit according to another embodiment of the invention.

FIGS. 9 and 10 show alternative designs of the circuits according to certain embodiments. Referring to FIG. 9, three sets of thyristor bridges are utilized to form an inverter, where each set of the thyristor bridges may be considered as an inverter for a particular phase. This circuit has the advantage that phase to neutral voltage can be regulated independently for all three phases. This may be a necessity in the case of unbalanced loads. Referring to FIG. 10, three set of diode bridges are utilized to form a rectifier, where each set of the diode bridges may be considered as a rectifier for a particular phase. By appropriately sizing the components to tune the first stage LCL resonant circuits to resonate frequencies, higher frequency harmonics can be minimized or eliminated.

Figure 11:
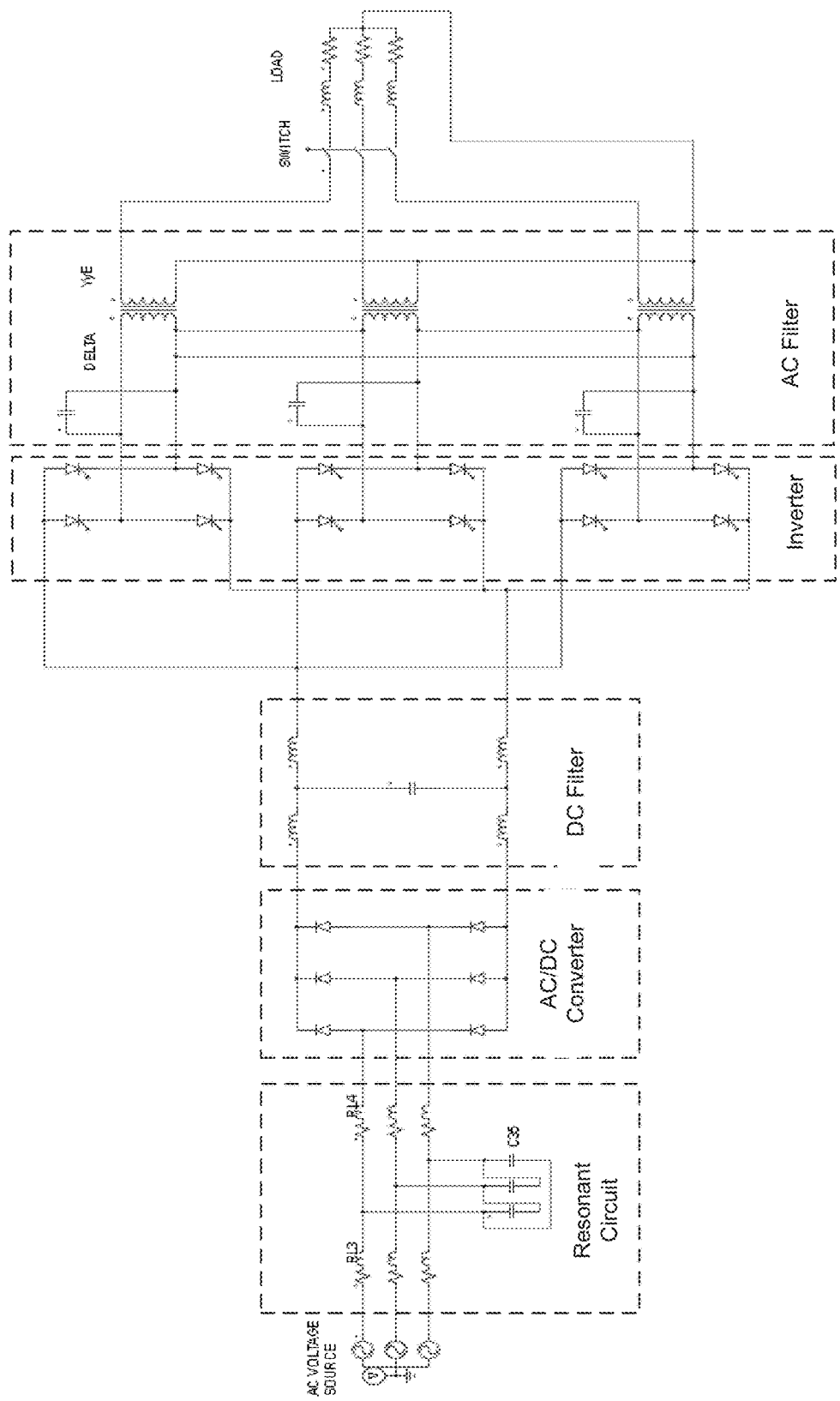
FIG. 11 is a schematic diagram illustrating a three-phase DC-AC converter circuit according to another embodiment of the invention.

FIG. 11 is a schematic diagram illustrating a three-phase DC-AC converter circuit according to another embodiment of the invention. In this embodiment, 3 single phase capacitor banks are used and a transformer. The transformer shown is 3 single phase, interconnected, however a single 3 phase transformer may be used in its place. Note that although not shown in FIGS. 9-11, a regulator may be coupled across the capacitor network of the three-phase resonant circuit or alternatively, the regulator may be coupled to an input of the inverter. In addition, a transformer may be implemented between the AC capacitor bank and the load for isolation purposes.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

CONCLUSION

The output current through the resistive load R259 is expressed as a function of load resistance. As can be seen, for the load range (0 to 12 ohms) the output current magnitude (RMS) does not change.

What is claimed is:

1. A power converter circuit, comprising:
   a resonant circuit coupled to a first alternating current (AC) voltage source to convert a first AC voltage of the first AC voltage source to a first AC current, wherein the resonant circuit is configured to resonate at an operating frequency of the first AC voltage source to convert the first AC voltage source to a first AC current source, wherein parameters of components of the resonant circuit are specifically selected to have a resonant frequency identical or similar to the operating frequency of the first AC voltage source, and wherein the first AC current source produces the first AC current as a constant AC current;
   an AC to direct current (AC/DC) converter coupled to the resonant circuit, wherein the AC/DC converter is to convert the first AC current source to a first DC current source;
   a first regulator coupled to an input of the AC/DC converter to regulate the first AC current;
   an inverter coupled to the AC/DC converter to convert the DC current source to a second AC current source;
   an AC filtering circuit coupled to an output of the inverter; and
   a load coupled to the output of the inverter to convert the second AC current source to a second AC voltage source.

2. The power converter circuit of claim 1, wherein the second AC current is a constant AC current.

3. The power converter circuit of claim 1, wherein the resonant circuit comprises an inductor-capacitor-inductor (LCL) circuit coupled in a wye configuration or a delta configuration.

4. The power converter of claim 3, further comprising a second regulator coupled to a capacitor of the LCL circuit.

5. The power converter circuit of claim 3, wherein the AC voltage source is a three-phase AC voltage source having three terminals, each terminal corresponding to one of three phases, and wherein the resonant circuit comprises three LCL circuits, each of the LCL circuits being coupled to one of the three terminals of the AC voltage source.

6. The power converter circuit of claim 5, further comprising three regulators, wherein each of the regulators is coupled to a capacitor of one of the LCL circuits.

7. The power converter circuit of claim 1, wherein the AC/DC converter comprises a rectifier.

8. The power converter circuit of claim 7, wherein the first regulator is coupled to an input of the rectifier.

9. The power converter circuit of claim 7, wherein the rectifier comprises a diode bridge having at least four diodes.

10. The power converter circuit of claim 7, wherein the AC voltage source is a three-phase AC voltage source, wherein the rectifier comprises three rectifiers, each of the rectifiers corresponding to one of the three phases.

11. The power converter circuit of claim 10, further comprising a three-phase regulator, wherein the three-phase regulator is coupled to inputs of the rectifiers.

12. The power converter circuit of claim 1, wherein the inverter comprises a single phase thyristor bridge having four thyristors or an insulated gate bipolar transistor (IGBT) bridge having four IGBTs.

13. The power converter circuit of claim 1, wherein the AC voltage source is a three-phase AC voltage source, wherein the inverter comprises a three-phase thyristor bridge having six thyristors or a three-phase IGBT bridge having six IGBTs.

14. The power converter circuit of claim 13, wherein the thyristors or IGBTs are switched on and off according to a predetermined sequence to generate three-phase AC power.

15. The power converter circuit of claim 1, further comprising an AC filtering circuit coupled across the load.

16. The power converter circuit of claim 15, wherein the AC filtering circuit comprises a capacitor bank.

17. The power converter circuit of claim 16, wherein the AC filtering circuit further comprises a transformer between the capacitor bank and the load for isolation.

18. A direct current (DC) current source circuit, comprising:
a resonant circuit coupled to a three-phase alternating current (AC) voltage source to convert an AC voltage to an AC current, wherein the resonant circuit includes a first inductor-capacitor-inductor (LCL) circuit coupled to a first terminal of the AC voltage source corresponding to a first phase, a second LCL circuit coupled to a second terminal of the AC voltage source corresponding to a second phase, and a third LCL circuit coupled to a third terminal of the AC voltage source corresponding to a third phase, wherein the resonant circuit is configured to resonate with an operating frequency of the three-phase AC voltage source to convert the AC voltage source to a three-phase AC current source, wherein parameters of components of the resonant circuit are specifically selected to have a resonant frequency identical or similar to the operating frequency of the first AC voltage source, and wherein the three-phase AC current source produces the AC current as a constant AC current; and
a rectifier coupled to the resonant circuit to convert the AC current to a DC current, wherein the rectifier includes a diode bridge having six diodes, wherein an output of the rectifier is coupled to a load.

19. The DC current source circuit of claim 18, wherein the DC current is a constant DC current.

20. The DC current source circuit of claim 18, further comprising a three-phase regulator coupled to an input of the rectifier.

21. The DC current source circuit of claim 18, further comprising a three-phase regulator coupled to a capacitor network of the first, second and third LCL circuits.

22. The DC current source circuit of claim 18, wherein each of the LCL circuit is connected in a wye configuration or a delta configuration.

* * * * *